United States Patent
Ragnet et al.

(10) Patent No.: US 9,619,701 B2
(45) Date of Patent: Apr. 11, 2017

(54) USING MOTION TRACKING AND IMAGE CATEGORIZATION FOR DOCUMENT INDEXING AND VALIDATION

(71) Applicant: Xerox Corporation, Norwalk, CT (US)

(72) Inventors: Francois Ragnet, Venon (FR); Damien Cramet, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 17 days.

(21) Appl. No.: 14/717,612

(22) Filed: May 20, 2015

(65) Prior Publication Data

US 2016/0342834 A1 Nov. 24, 2016

(51) Int. Cl.
G06K 9/00 (2006.01)
G06K 9/22 (2006.01)
G06K 9/20 (2006.01)
G06F 3/0484 (2013.01)

(52) U.S. Cl.
CPC ..... G06K 9/00463 (2013.01); G06F 3/04845 (2013.01); G06K 9/00449 (2013.01); G06K 9/00456 (2013.01); G06K 9/2063 (2013.01); G06K 9/22 (2013.01)

(58) Field of Classification Search
CPC ........ G06K 9/186; G06K 9/0449; G06K 9/22; G06K 9/2063; G06K 2209/01; G06K 9/00; G06K 9/00463; G06K 7/10722; G06K 9/00442; G06K 9/00456; G06K 9/2054; G06K 9/685; G06F 3/0488; G06F 3/04842
See application file for complete search history.

(56) References Cited

U.S. PATENT DOCUMENTS

| | | | |
|---|---|---|---|
| 5,673,320 A | 9/1997 | Ray et al. | |
| 5,770,841 A | 6/1998 | Moed et al. | |
| 6,106,020 A | 8/2000 | Leef et al. | |
| 6,678,413 B1 | 1/2004 | Liang et al. | |
| 7,299,408 B1 | 11/2007 | Daconta et al. | |
| 7,503,488 B2 | 3/2009 | Davis | |
| 7,782,365 B2 * | 8/2010 | Levien | H04N 1/2112 348/220.1 |
| 8,144,921 B2 * | 3/2012 | Ke | G06K 9/00463 382/100 |
| 8,184,155 B2 | 5/2012 | Ke et al. | |
| 8,249,343 B2 | 8/2012 | Perronnin et al. | |
| 8,538,124 B1 * | 9/2013 | Harpel | G06K 9/03 382/131 |

(Continued)

Primary Examiner — Jingge Wu
(74) Attorney, Agent, or Firm — Gibb & Riley, LLC

(57) ABSTRACT

Systems and methods include an application operating on a device. The application causes the graphic user interface of the device to display an initial instruction to obtain a full-view image that positions all of an item within a field of view of a camera on the device. The application automatically recognizes identified features of the full-view image, by using a processor in communication with the camera. After displaying the initial instruction, the application causes the graphic user interface to display a subsequent instruction to obtain a zoom-in image that positions only a portion of the item within the field of view of the camera. Also the application automatically recognizes patterns from the zoom-in image, using the processor. Furthermore the application performs an authentication process using the identified features and the patterns to determine whether the item is valid, using the processor.

16 Claims, 24 Drawing Sheets

(56) References Cited

U.S. PATENT DOCUMENTS

| | | | | |
|---|---|---|---|---|
| 8,837,806 B1* | 9/2014 | Ethington | ............... | G06Q 40/02 |
| | | | | 382/140 |
| 8,949,287 B2* | 2/2015 | Hull | ................... | G06K 9/00442 |
| | | | | 707/804 |
| 9,147,275 B1* | 9/2015 | Hyde-Moyer | ........... | G06T 11/60 |
| 9,171,202 B2* | 10/2015 | Hull | ................... | G06K 9/00456 |
| 9,342,930 B1* | 5/2016 | Kraft | ...................... | G06T 19/006 |
| 2009/0077386 A1 | 3/2009 | Simonian | | |
| 2010/0008582 A1* | 1/2010 | Kim | ................... | G06F 17/2863 |
| | | | | 382/177 |
| 2010/0141758 A1* | 6/2010 | Kim | ......................... | G06K 9/20 |
| | | | | 348/135 |
| 2014/0168478 A1* | 6/2014 | Baheti | .................. | G06K 9/2081 |
| | | | | 348/240.99 |
| 2015/0334567 A1* | 11/2015 | Chen | ................. | G06K 9/00248 |
| | | | | 455/411 |
| 2016/0205358 A1* | 7/2016 | Dickinson | ................ | G06K 9/00 |
| | | | | 348/157 |

* cited by examiner

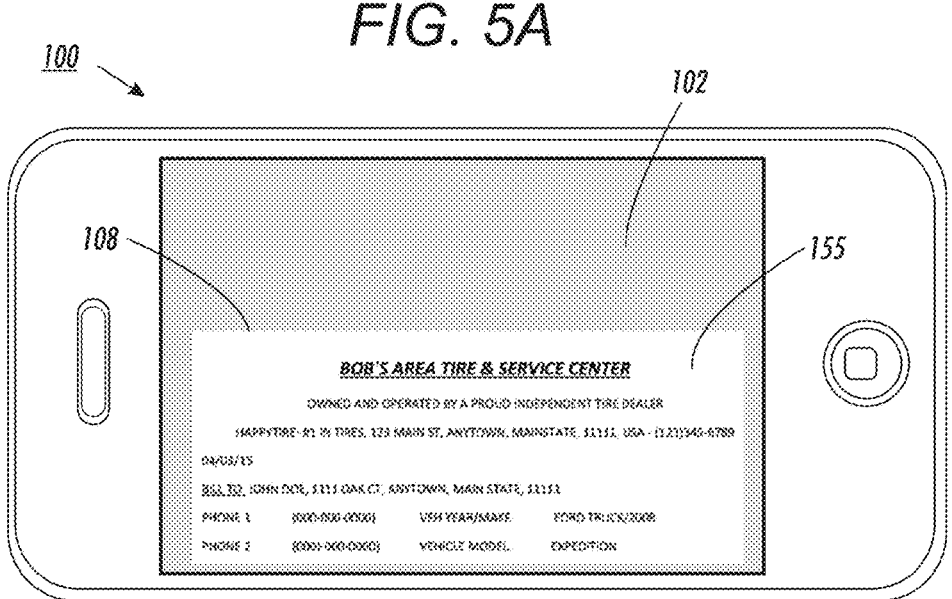

BOB'S AREA TIRE & SERVICE CENTER — 155

OWNED AND OPERATED BY A PROUD INDEPENDENT TIRE DEALER

HAPPYTIRE- #1 IN TIRES, 123 MAIN ST, ANYTOWN, MAINSTATE, 11111, USA - (123)345-6789

04/03/15

BILL TO: JOHN DOE, 1111 OAK CT, ANYTOWN, MAIN STATE, 11111

PHONE 1      (000-000-0000)         VEH YEAR/MAKE.      FORD TRUCK/2008

PHONE 2      (000)-000-0000)        VEHICLE MODEL.      EXPEDITION

DATE REQUESTED   04/03/15           VEHICLE COLOR.      BLACK

LICENSE/STATE. 1111102/ MAIN STATE

RETURN PARTS - NO                   ODOMETER     IN/OUT 111110/ 111111

SALESMAN    033 / 884    VEHICLE    ID #.    ABC11223344556677

PRIOR INVOICE. 000001

| SLSM | TECH | PRODUCT | QTY | DESCRIPTION PARTS | | LINE TOTAL | |
|------|------|---------|-----|-------------------|---|------------|---|
| 033 | 106 | 046-100 | 1 | CHECK LOOSE TIRE FOR REPAIR | | .00 | .00 |
| 033 | 106 | 046-223 | 1 | MISCELLANEOUS SHOP SUPPLIES | | .00 | .00 |
| 033 | 106 | 046-100 | 1 | SENSOR ON RF RIM SNAPPED IN HALF | | .00 | .00 |
| 033 | 106 | 040-231 | 1 | TIRE PRESSURE MONITOR SENSOR | | .00 | .00 |
| 033 | 106 | 040-237 | 4 | TIRE PRESSURE MONITOR SYSTEM | | .00 | .00 |

*** IF NOT COMPLETELY SATISFIED, PLEASE CALL THE STORE

MANAGER BILLY BOB JONES AT (123)-345-6789 ***

PARTS TOTAL      .00

LABOR TOTAL      .00

SUB TOTAL        .00

— 156

X     TAXABLE      AMOUNT      .00      SALES TAX      .00

CUSTOMER AUTHORIZATION FOR TOTAL

INVOICE TOTAL:    $00.00

Customer Signature: *John Doe*          Date  *04/14/2015*

USING MOTION TRACKING AND IMAGE CATEGORIZATION FOR DOCUMENT INDEXING AND VALIDATION

BACKGROUND

Systems and methods herein generally relate to verification of items and more particularly to verifying scans and images of such items.

One of the largest and most labor-intensive businesses is the scanning and indexing of documents. In this business, customers send scanning companies volumes of physical documents (which can be hundreds of thousands or even millions of physical pages of paper per day). These paper documents are received in boxes and prepared/scanned in very large bulk scanning centers, to be faxed directly by the customer to the companies fax servers, or scanned on customer premises then sent electronically into the company's locations.

SUMMARY

Exemplary methods herein can be executed using, for example, a program of instructions (an "app") running on a portable device, such as a user's smartphone. These methods cause the graphic user interface of a device (such as a portable device or smartphone) to display initial instructions to the user to obtain continuous video that initially positions all of an item or document within the field of view of the camera on the device (e.g., so the entire document is captured in the continuous video recording).

These methods automatically recognize features of the document from a full-view video frame of the continuous video (e.g., that was obtained when the entire item was within the field of view of the camera) using a processor in communication with the device's camera. Because the scanning ability of the user's portable device is limited, the full-view video frame is of insufficient quality to reliably recognize patterns, but is of sufficient quality to recognize the identified features. This process also classifies the item based on the identified features to determine what type of document is in the full-view frame (and can initially determine whether the item is valid based on whether the classification of the item matches a valid classification).

After the initial instructions are displayed, the methods cause the graphic user interface to display subsequent instructions to zoom in on one or more portions of the item (e.g., so as to position only a portion of the item within most or all of the field of view of the camera) while continuing to obtain the continuous video recording (without stopping the continuous video recording). The methods also automatically recognize patterns from a zoom-in video frame of the continuous video (e.g., that was obtained when only a portion of the item occupied the field of view of the camera) using the processor.

The process also determines whether the zoom-in video frame is actually of the item based on whether the continuous video is unbroken between the full-view frame and the zoom-in frame. In other words, these methods monitor the video for continuity (in order to determine whether the video is discontinuous between the full-view frame and the zoom-in frame). If the video is found to be discontinuous (not unbroken) after displaying the subsequent instruction, the methods cause the graphic user interface to repeat the initial instruction to begin again with the full-view video frames of the entire item, and subsequently repeat the subsequent instructions to obtain the zoom-in video frames.

These methods perform an authentication process that can use both the identified features and the patterns to determine whether the item is valid. In the authentication process, these methods can determine whether the item is valid based on the classification of the item matching a valid classification, and based on the patterns matching known, previously validated data. The authentication process can be performed entirely locally on the portable device that is used to obtain the images (if the item classification data and the known, previously validated data are stored within storage of the portable device) or such authentication data can be remotely stored in one or more databases of one or more remote servers and accessed through any convenient network accessible by the portable device.

Other methods herein cause the graphic user interface of the user's portable device to display an initial instruction to obtain a full-view still image that positions all of the item within the field of view of a camera of the device. Similar to the processing discussed above, these methods can also automatically recognize features of the document from a full-view still image using a processor in communication with the device's camera. This process can also classify the item based on the identified features to determine what type of document is in the full-view still image (and can initially determine whether the item is valid based on whether the classification of the item matches a valid classification).

After displaying the initial instruction, these methods cause the graphic user interface to display a subsequent instruction to obtain a zoom-in still image that positions only a portion of the item within the field of view of the camera. These methods also automatically recognize the patterns from the zoom-in still image.

This process also determines whether the zoom-in image is actually of the item based on an overlap of image features between the full-view image and the zoom-in image. More specifically, this processing evaluates the zoom-in image for continuity with the full-view image based on an overlap of image features between the full-view image and the zoom-in image, and this identifies whether the zoom-in image is discontinuous with the full-view image. If the zoom-in image is found to be discontinuous with the full-view image after displaying the subsequent instruction, the methods cause the graphic user interface to repeat the initial instruction to again obtain a full-view image of the entire item, and subsequently repeat the subsequent instructions to obtain the zoom-in image.

Such methods also perform an authentication process using both the identified features and the patterns to determine whether the item is valid. In the authentication process, these methods can determine whether the item is valid based on the classification of the item matching a valid classification, and based on the patterns matching known, previously validated data. The authentication process can be performed entirely locally on the portable device that is used to obtain the images (if the item classification data and the known, previously validated data are stored within storage of the portable device) or such authentication data can be remotely stored in one or more databases of one or more remote servers and accessed through any convenient network accessible by the portable device.

Exemplary systems herein include an application operating on a device, such as a user's portable device (e.g., a smartphone) that has limited scanning capabilities (a camera having a lower resolution than a flatbed scanner). The application causes a graphic user interface of the device to display an initial instruction to obtain continuous video that positions all of an item within the field of view of a camera of the device. The application also automatically recognizes identified features of the item from a full-view video frame of the continuous video (e.g., obtained when all of the item was within the field of view of the camera) using a processor in communication with the camera. The application classifies the item based on the identified features to determine what type of document is in the full-view frame (and can initially determine whether the item is valid based on whether the classification of the item matches a valid classification).

After displaying the initial instruction, the application causes the graphic user interface to display a subsequent instruction to zoom in on the item and position only a portion of the item within some or all of the field of view of the camera while continuing to obtain the continuous video. The application further automatically recognizes patterns from a zoom-in video frame of the continuous video (obtained when only the portion of the item occupied the field of view of the camera) using the processor.

Additionally, the application performs an authentication process using the identified features and the patterns to determine whether the item is valid, using the processor. In the authentication process, the application can determine whether the item is valid based on the classification of the item matching a valid classification, and based on the patterns matching known, previously validated data. The authentication process can be performed entirely locally on the portable device that is used to obtain the images (if the item classification data and the known, previously validated data are stored within storage of the portable device) or such authentication data can be remotely stored in one or more databases of one or more remote servers and accessed through any convenient network accessible by the portable device.

Other systems herein include an application operating on a device, such as a user's portable device (e.g., a smartphone) that has limited scanning capabilities (a camera having a lower resolution than a flatbed scanner). The application causes a graphic user interface of the device to display an initial instruction to obtain a still image that positions all of an item within the field of view of a camera of the device. The application also automatically recognizes identified features of the item from a full-view still image (e.g., obtained when all of the item was within the field of view of the camera) using a processor in communication with the camera. The application classifies the item based on the identified features to determine what type of document is in the full-view still image (and can initially determine whether the item is valid based on whether the classification of the item matches a valid classification).

After displaying the initial instruction, the application causes the graphic user interface to display a subsequent instruction to zoom in on the item and obtain a zoom-in still image of only a portion of the item (within some or all of the field of view of the camera). The application further automatically recognizes patterns from a zoom-in still image (obtained when only the portion of the item occupied the field of view of the camera) using the processor.

Additionally, the application performs an authentication process using the identified features and the patterns to determine whether the item is valid, using the processor. In the authentication process, the application can determine whether the item is valid based on the classification of the item matching a valid classification, and based on the patterns matching known, previously validated data. The authentication process can be performed entirely locally on the portable device that is used to obtain the images (if the item classification data and the known, previously validated data are stored within storage of the portable device) or such authentication data can be remotely stored in one or more databases of one or more remote servers and accessed through any convenient network accessible by the portable device.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 5A-5D are schematic diagrams illustrating devices and processes performed herein;

DETAILED DESCRIPTION

Figure 1A:
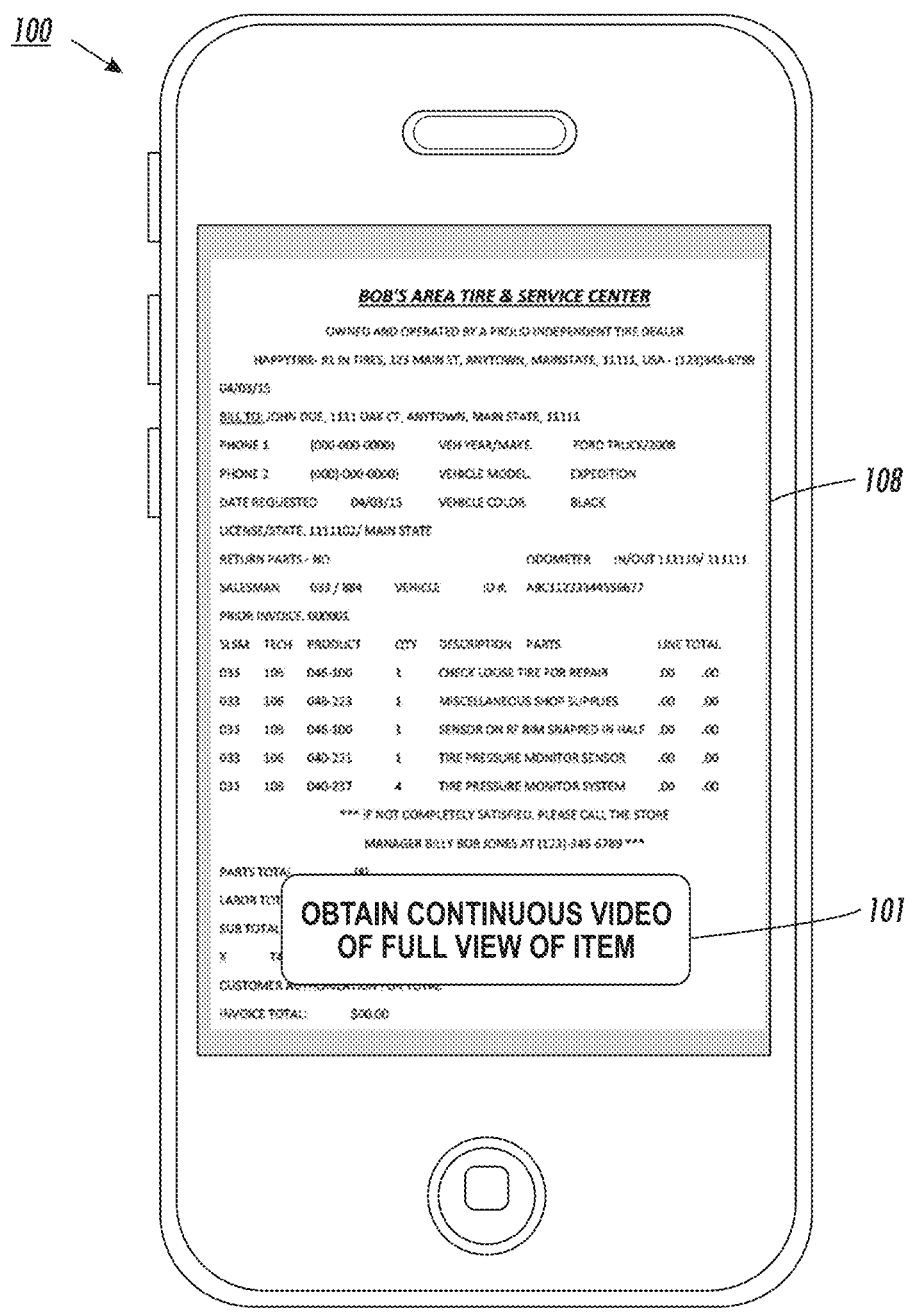
FIGS. 1A-1L are schematic diagrams illustrating devices and processes performed herein.

As mentioned above, customers send companies volumes of documents (that can be hundreds of thousands or even millions of physical pages per day) that are received in boxes or are prepared/scanned in very large bulk scanning centers, faxed directly by the customer to the companies fax servers, or scanned on customer premises then sent electronically into the company's locations.

However, to address time-critical processes, such as bank account opening, mobile phone subscription, insurance claim submission etc., which drive volume away from the bulk scanning centers, more remote processing can improve this process. In new transactions, turnaround time is valued, as fraud can have very significant impact. New technologies are appearing, such as digital contract generation to generate new contracts electronically, and mobile phone and tablet scanning of documents.

However, a number of physical documents still need to be scanned for verification/recording (e.g., ID cards, checks, proof of bank identity, proof of address, etc.). These documents should not only be recognized but also extracted/validated as quickly as possible, to eliminate the potential for fraud.

For example, when requesting a signed version of a contract, a number of accompanying documents can be used. These can include an ID card, a proof of identity, a bank statement, or other documents. Extraction and validation typically involve the following steps: confirming the overall document is of the expected, correct type (e.g., utility bill, ID card, etc. . . . ); verifying that the document does belong to the relevant person (i.e., contains name/address that matches the account holder, etc); etc. The validation process can also include potentially extracting other relevant metadata in the same document (e.g., full address, credit score, etc.).

These extraction and validation steps can usually be performed instantly and reliably from an image captured by a flatbed scanner. The image resolution and capture quality of the flatbed scanner is usually sufficient to allow image recognition, and highly accurate full page OCR. With the OCR results, advanced extraction makes it easy to locate an identifier, such as a name, and confirm the identifier's presence and to find other relevant fields used for validation of the user and/or the document.

The extraction and validation steps also can rely on a full-page search for relevant items, or "Regions of Interest" (RoI) defined relative to the full page or relative to the contextual textual anchors (e.g., "Address", "DOB") or pattern searches. In many cases (e.g., utility bills), the RoI can appear anywhere on the page, based on document sub-types.

Letting an end user (e.g., sales agent) do the same from a mobile device can improve this process significantly, as this enables a quicker turnaround. For example, validating a customer's credentials before the customer walks out of the shop with an expensive smartphone would be very beneficial to a telecom operator. Similarly, validating a bank account prospect immediately and submitting the account opening documents (after sufficient validation) would minimize risks of the customer deciding to turn down the offer or looking for a better offer from a competitor.

In the current mailroom/flatbed scanner scenario, the paper documents are shipped to a location where they can be scanned, processed, and verified, which typically takes days, thus preventing quick near real-time validation. These processes that produce high quality scans using flatbed scanners also require significant work from company service agents to perform all the paper handling and indexing tasks, etc., which represents a substantial cost.

Scanning, extraction and validation using portable computing devices such as personal computers, tablets, smartphones, etc., suffers from lack of quality and consistency. Image quality of the cameras included within portable computing devices varies greatly, and is generally not sufficient to allow both full-page document recognition simultaneously with fine-grained OCR capabilities for useful metadata fields. Issues with scans from portable computing devices result from the high variability of image sensor types, variations of capture conditions (including end user injected problems such as focusing errors, blurred images, inappropriate lighting, etc.), and non-uniform capture. For example, with a capture of an image of a full page document using a smartphone, it would be unlikely to achieve the required recognition accuracy using common OCR programs. Therefore, the systems and methods herein combine video motion tracking and image categorization to improve the quality of document capture and perform automatic processing and validation of documents, when both the full document and specific Regions of Interest are used in the processing.

Different workflows and applications are described below, including combining video motion tracking with multiple user capture and validation of document parts (full, RoI) from a video stream, and an optimal on-device vs. off-device processing that streamlines the process of validating fields on that document and making it possible, efficient, and acceptable from a (mobile device) end user perspective.

This can also be applied to natural image capture, where the overall context is used, and specific close-ups are used to pick up or validate specific elements. An alternative implementation for the identification and capture of large documents uses categorization, panning, and motion tracking.

For example, a user might expect some or all field(s) to be known in advance. This is likely to be a frequent case (e.g., as part of an account opening workflow, where the name of the person is known (either as metadata to the folder, or extracted from another document)). In this workflow, the systems and methods instruct the user to zoom and pan from the full document view to the specific Regions of Interest in the document that is of an expected type (e.g., "authoritative" documents such as ID cards, utility bill, etc.). The example document generally contains the expected metadata (i.e., corresponding name) and the processing can extract additional fields (e.g., address, date of birth, etc.).

In one example, the user experience can follow a process where the first step is to capture a full view of the document being used. After this initial step is undertaken in the capture application, the image is automatically recognized. Based on a recognized category/document type, the system and methods herein recognize that one field is used, an address for proof of validation. Using a motion tracking system, the system tracks various elements within the document, to make sure that the camera view is not taken off the initial document in the full view image. As the user continues to take the video, the camera enlarges a Region of Interest (either through a button press, or by standing still) and the RoI image is captured. Because of the larger features of characters in the zoomed-in Region of Interest, the image can be processed and an OCR process completed very quickly and at a high quality, possibly without binarization or pre-processing (e.g., using on-device OCR). For example, the RoI could contain an account name (e.g., John Doe) and the systems and methods are able to confirm this account name as being valid thanks to the high-quality image.

One way of "fooling" scanning systems is to show the original full document for document recognition (e.g., ID card) and then zoom/pan to a different (non-authoritative) document with the required metadata field. The systems and methods herein avoid this scenario by using motion tracking throughout the video frames between the full page document identification and the RoI recognition. If motion tracking is lost from the full-view document, it could be that the user tried to "fool" the system by pointing to a different document. If this occurs, the systems and methods herein display a warning, and instruct the user to return to the first step to reacquire a full page image of the document.

The system and methods described herein can also process overlaid Regions of Interests on images with known templates to allow such to be processed quicker. Specifically, after a full-page document has been recognized, document borders can be detected and tracked. Regions of Interest are overlaid on top of the tracked image document, to guide the user to the various RoIs to help the user manually zoom the video to the various areas where relevant information is located on the document. When data to validate is not part of the workflow, in case there are multiple fields to index in the document, these fields can be captured all at once. When all document fields are captured, the data is presented back to the user for validation. This prevents cutting the video capture flow with validation steps, which could otherwise break the motion tracking validation.

The system and methods described herein are also applicable to individual image capture, where a large "context" or overall scene image is captured, and individual images of specific elements within the larger scene are captured in greater detail in zoom-in images. For example, in case of a car accident, pictures of the overall scene are used for the overall context (location, orientation, etc.). The systems and methods herein identify elements that are within the overall image of the scene in the more narrow zoom-in images of specific aspects of the scene in order to more clearly illustrate specific details within the original scene, to make sure the zoom-in images actually belong to the original scene, and to determine where the zoom-in images belong in the overall scene. For example on a car accident scene, one might authenticate the damaged car license plates to formally identify the car, then point at other elements of interest, e.g., damage on the car, marks on the road, impacted telephone pole, etc. Here again the broad scene capture, manual zoom and pan (optionally with image categorization and recognition) would be elements, while the motion tracking could make the images more "authoritative" and trusted than screenshots taken in isolation.

Other aspects of systems and methods herein that capture large documents and ensure a sufficient image quality to obtain usable results from OCR combine panning and stitching. For instance, vehicle service documents are long and contain small characters. Using a picture of the whole document taken with a low resolution smartphone will not allow good OCR results on a regular basis. In view of this, the system and methods herein also provide processing in which the user is instructed to obtain multiple zoom-in images of different portions of the document in order to provide higher quality images that improve characters recognition results. This processing combines identification of the top and the bottom of the document using an image categorizer; panning and stitching to capture and build complete document view motion-tracking to control that the capture is valid.

Referring now to FIGS. 1A-1L some methods herein can be executed using, for example, a program of instructions (an "app") running on a portable device, such as a user's smartphone 100. As shown in FIG. 1A, these methods use the app to cause the graphic user interface of the device 100 to display initial instructions 101 to the user, to obtain continuous video that initially positions all of an item 108 within the field of view of the camera on the device (e.g., so the entire item 108 is captured in the continuous video recording).

Figure 1B:
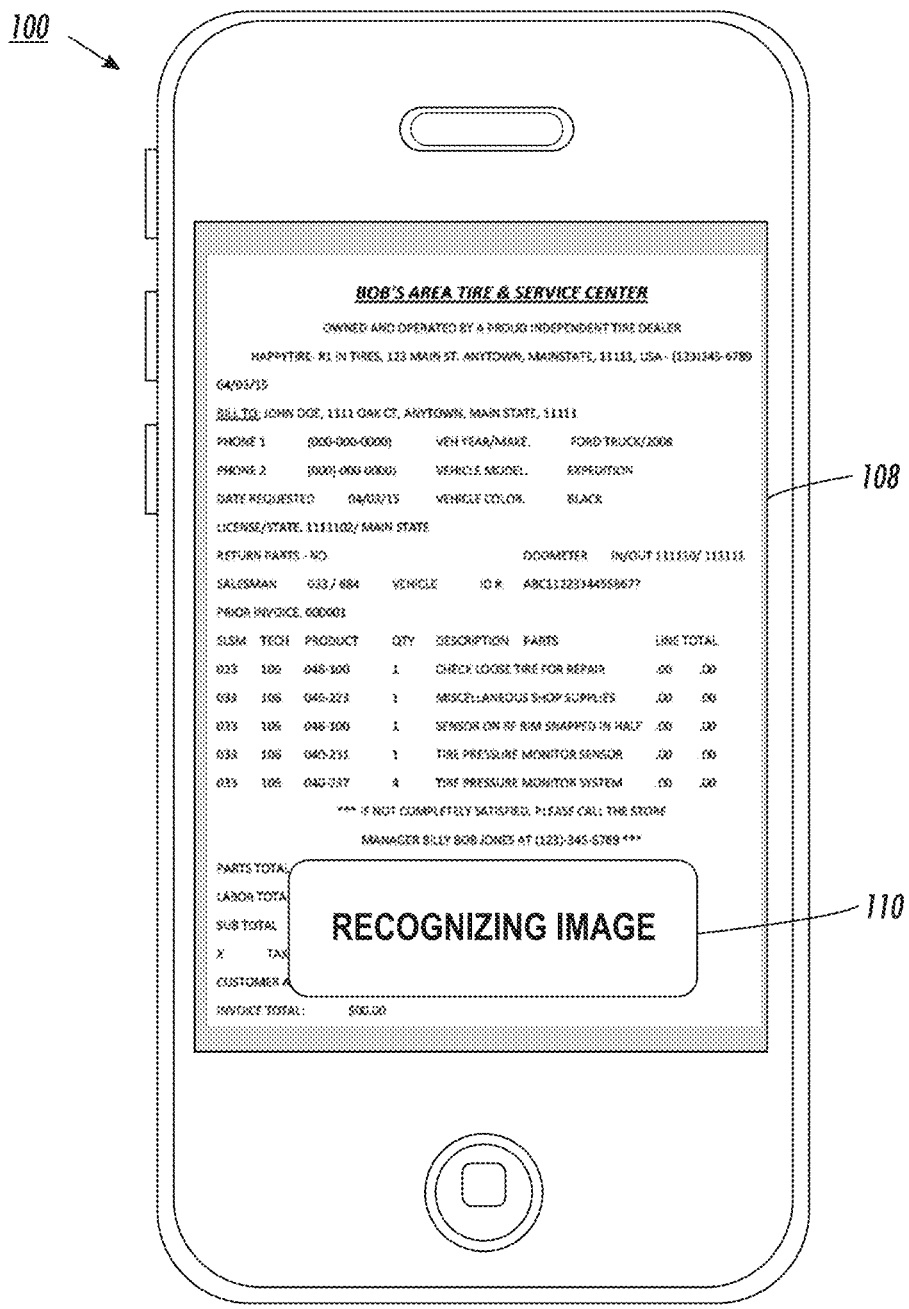

As seen in FIG. 1B, the method causes the user's device 100 to display an information box (item 110) on the graphic user interface of the device 100, over the document 108, telling the user that device is in the process of automatically recognizing the image, which involves categorizing the type of item within the image. Item 108 can be categorized using many different methods. For example, some categorization processes use the locations of specific markings, which can be specific designs (e.g., logos, government insignia, etc.) or specific patterns of columns or other features, to categorize the item 108. Other categorization methods can match data field patterns to known categories of items. For example, many ID badges include a photograph of the individual in a specific location, many negotiable instruments include decorative designs at the top, etc., and such patterns of items can be used to categorize the items. Additionally, optical character recognition can be performed on larger characters that are printed in larger font sizes to identify some of the title words of a document so as to categorize the document according to subject and/or establishment name. Those ordinarily skilled in the art what understand that other categorization techniques are equally applicable, and the claims provided below are not limited to the small number of examples of categorization methodologies discussed herein.

Figure 1C:
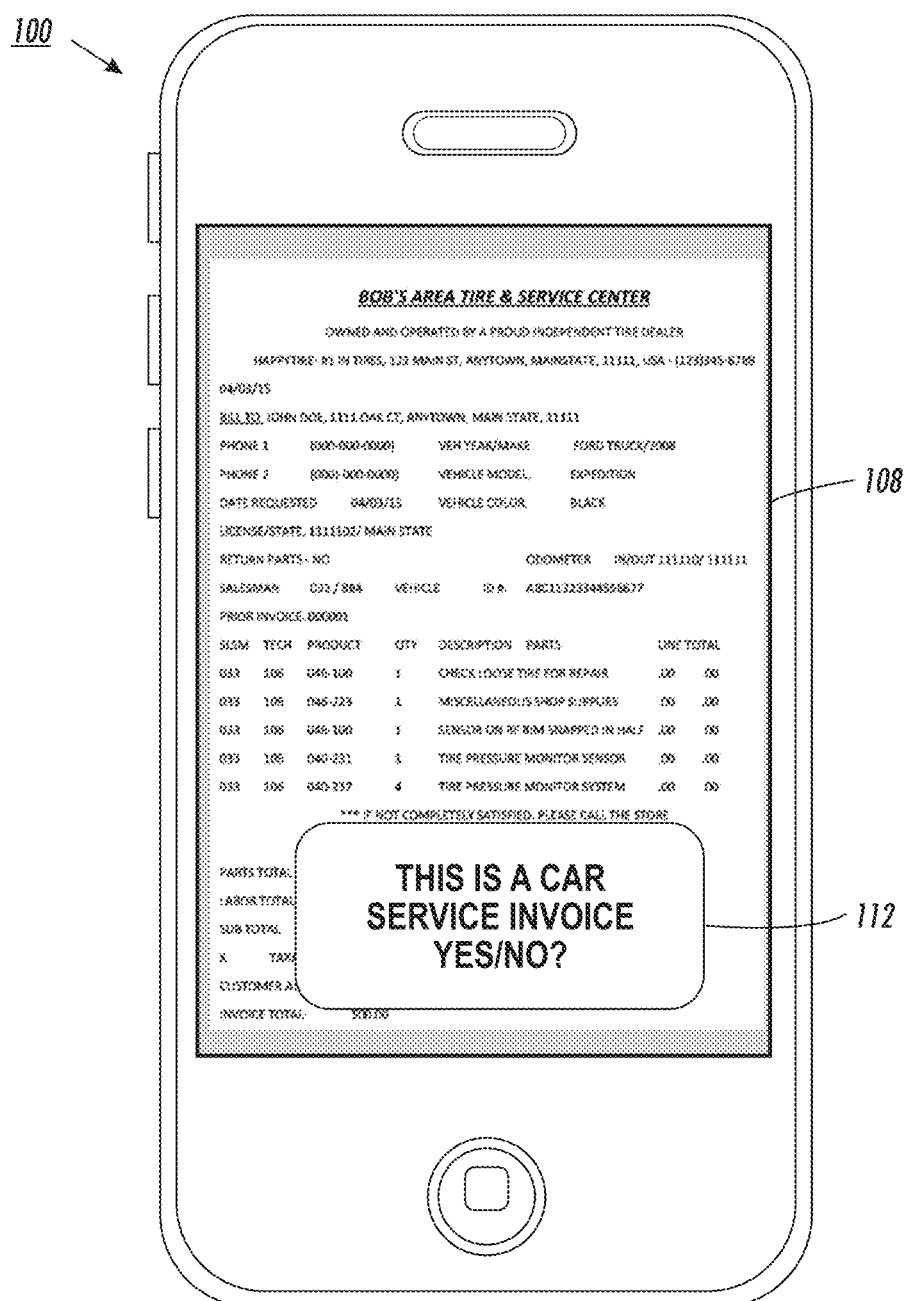

Once the document type or category of item 108 is identified, as shown in FIG. 1C, the method causes the user's device 100 to prompt the user with a subsequent information box (item 112) on the graphic user interface of the portable device 100 to verify whether the processor has correctly identified the type or category of item/document. In the example shown in the drawings, the item is automatically categorized as a car service invoice 108 by the systems and methods herein.

Figure 1D:
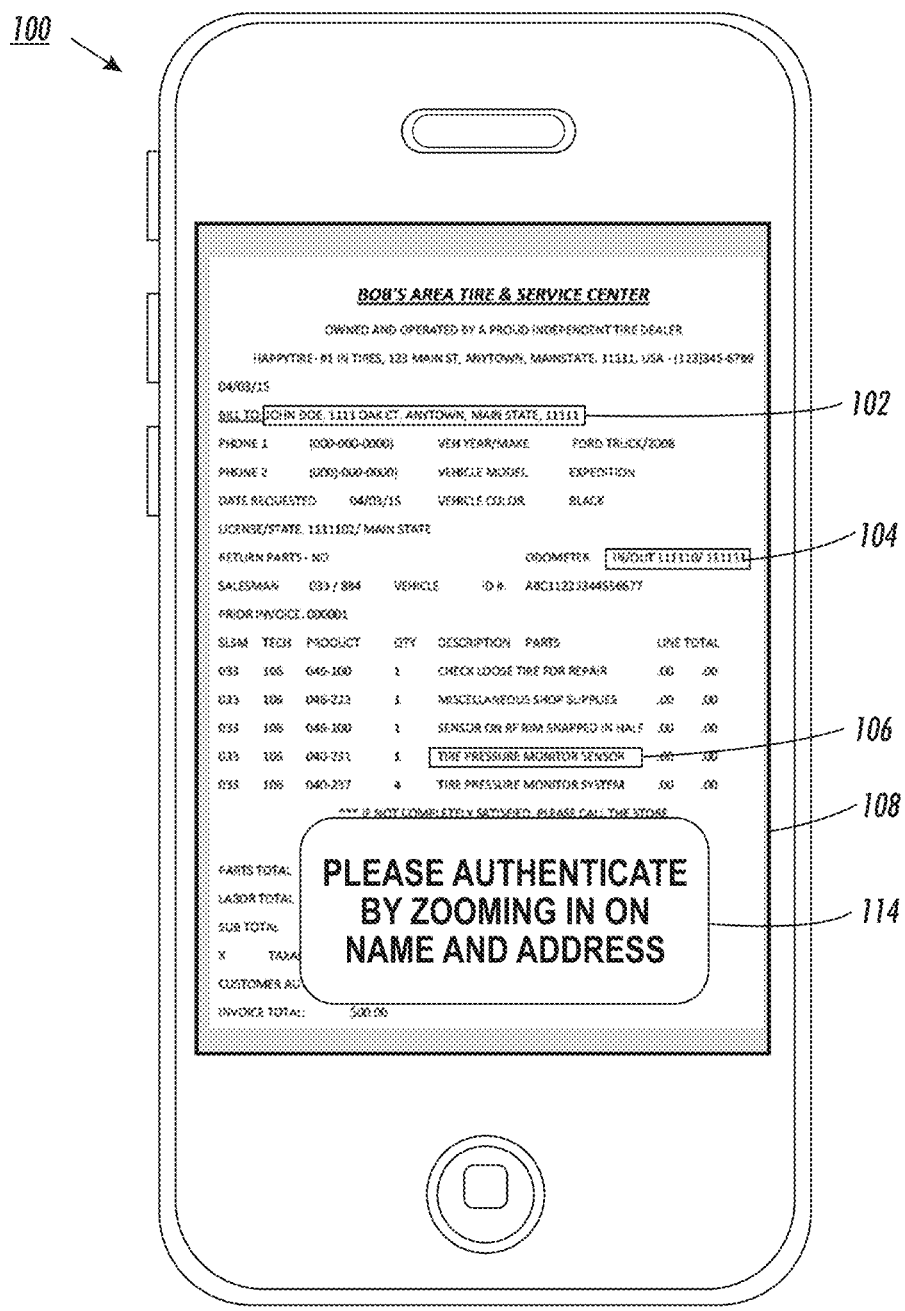

As part of the authentication process, as shown for example in FIG. 1D, the systems and methods herein causes the user's device 100 to display a request 114 for the user to zoom in on various portions of the document.

The terms "zoom in" and "zoom out" used herein are intended to convey the commonly understood meaning of taking some action with a camera to enlarge the item within the image electronically captured by the camera. This is commonly done by moving the camera closer to the item (for zooming in) or moving the camera further away from the item (for zooming out). Alternatively, many cameras include zoom in/zoom out controls that physically move lenses of the camera to change their relative spacing, or digitally change the magnification of the camera to increase or decrease the size of the item within the image obtained. In one respect, when a user zooms in with a camera, the features of the item become larger within electronic image that is obtained (and potentially less of the item is captured within the field of view of the camera) and vice versa when zooming out. For purposes herein, the zooming in the process makes patterns (such patterns can be alphanumeric characters (letters, number etc.); non-alphanumeric characters (comma, space, other punctuation); generalized shapes/image pattern (e.g. logos etc.)), relatively larger within the electronic image, thereby increasing the accuracy of automated character recognition processes.

As also shown and FIG. 1D, the app automatically highlights some fields that are useful for extraction and for authenticating the document, as seen in exemplary items 102, 104, and 106. More specifically, item 102 is a name and address field; item 104 is a data field (a mileage amount shown on an odometer in this example); item 106 is a line entry data (a tire component in this example); etc.

In the example shown in FIG. 1D, the user is requested to zoom in on the name and address field 102 in the request 114. The process of zooming in would not be necessary to provide high-quality automated character recognition results if the document 108 were being scanned with a traditional flatbed scanner (having a relatively higher resolution than a smartphone camera); however, because the relatively lower resolution of a smartphone camera is being utilized to obtain the image of the document 108, in order to reliably obtain accurate optical character recognition results, the systems and methods herein instruct the user to zoom in on one or more of the fields 102, 104, and 106 so as to enlarge the characters within the captured electronic image (And thereby increase automated character recognition processing accuracy and quality).

The specific fields for scanning 102, 104, and 106 that are automatically identified for up close scanning by the systems and methods herein will vary depending upon the category or type of document (that is confirmed by the user interacting with message 112 in FIG. 1C). Therefore, in the automobile service invoice 108 example shown in the accompanying drawings, the user's name and address, vehicle identification, mileage, replacement parts, service performed, user signature, etc., are items that are usually included in all documents that match the category of "automobile service invoice." Understandably, different document categories will generally include different data fields. In this example, it has been previously deemed useful for the user name and address, vehicle mileage, and repair descriptions to be included for scanning. Such may be useful to allow the user to maintain a database of their personal vehicle repair history, or may be useful for the vehicle repair shop to maintain a database of the history of work performed on different customer vehicles.

Those ordinarily skilled in the art would understand that different categories of documents would have different types of information that may be considered useful, and that other specific implementations may consider different fields within the automobile service invoice other than those specified above to be useful. Therefore, while an automobile service invoice is presented with the examples discussed herein, the claims below are not limited to this specific example, but instead are applicable to all categories of documents and all types of data that may be obtained from such documents. For example, if a negotiable instrument is scanned, the names, monetary amounts, signature lines, etc., may be items that would be considered useful for scanning (and such items would be automatically highlighted within the image of the negotiable instrument on the graphic user interface of the user's device by systems and methods herein); while, to the contrary, if a utility bill is scanned, the user account number, username, billing period, energy usage, billing amount, etc., could be considered useful items for scanning (and again, such different items would be automatically highlighted within the image of the utility bill on the graphic user interface of the user's device by systems and methods herein). Further, those ordinarily skilled in the art would understand that different data items from such documents will have different usefulness depending upon the various goals that are desired to be obtained through the scanning of the document.

The locations of such fields 102, 104, and 106 can be known in advance or can be automatically identified. Thus, when the category of document is confirmed by the user interacting with message 112 in FIG. 1C, this can identify a standard, previously known document that has data fields in known locations (e.g., where the form is issued by a governmental agency, standards organization, etc.). For example, in many forms documents (automobile registration, apartment registration, club registration, etc.) all fields are in a known location. Therefore, with such standardize forms, once the form type is confirmed through the user interacting with the message 112, the locations of items 102, 104, and 106 are known because the format of the standardize form has been previously established within a known database.

Alternatively, the systems and methods herein can automatically identify the location of the various fields 102, 104, and 106 even using the relatively lower resolution full-view image shown in FIGS. 1A-1D, using shape matching (because known shapes can be identified even using relatively lower resolution images). For example, with respect to the name and address field 102, the systems and methods herein can automatically locate the shape of the words "name" and/or "address" even without using optical character recognition processing because only overall word shape matching is being performed to generally identify the location of the name and address field 102.

In other situations, the systems and methods herein may not highlight the specific fields as is shown in FIG. 1D, but instead can merely instruct the user to zoom in on specific data field categories (e.g., name, address, mileage, etc.) that are generally found in items that match the item category (e.g., automobile repair invoice) that is confirmed through the user interaction with message 112 in FIG. 1C. Therefore, in this situation, rather than highlighting specific fields within the image of the document, the systems and methods herein can allow the user to locate such items within the image of the document themselves.

Thus, after the initial instructions 101, 110, and 112 are displayed, the methods cause the graphic user interface to display subsequent instructions 114 to zoom in on just a portion of the item 108 while continuing to obtain the continuous video recording (without stopping the continuous video recording), so as to position only a portion (e.g., name and address field 102) of the item within most or all of the field of view of the camera, as demonstrated in FIGS. 1E-1H.

Figure 1E:
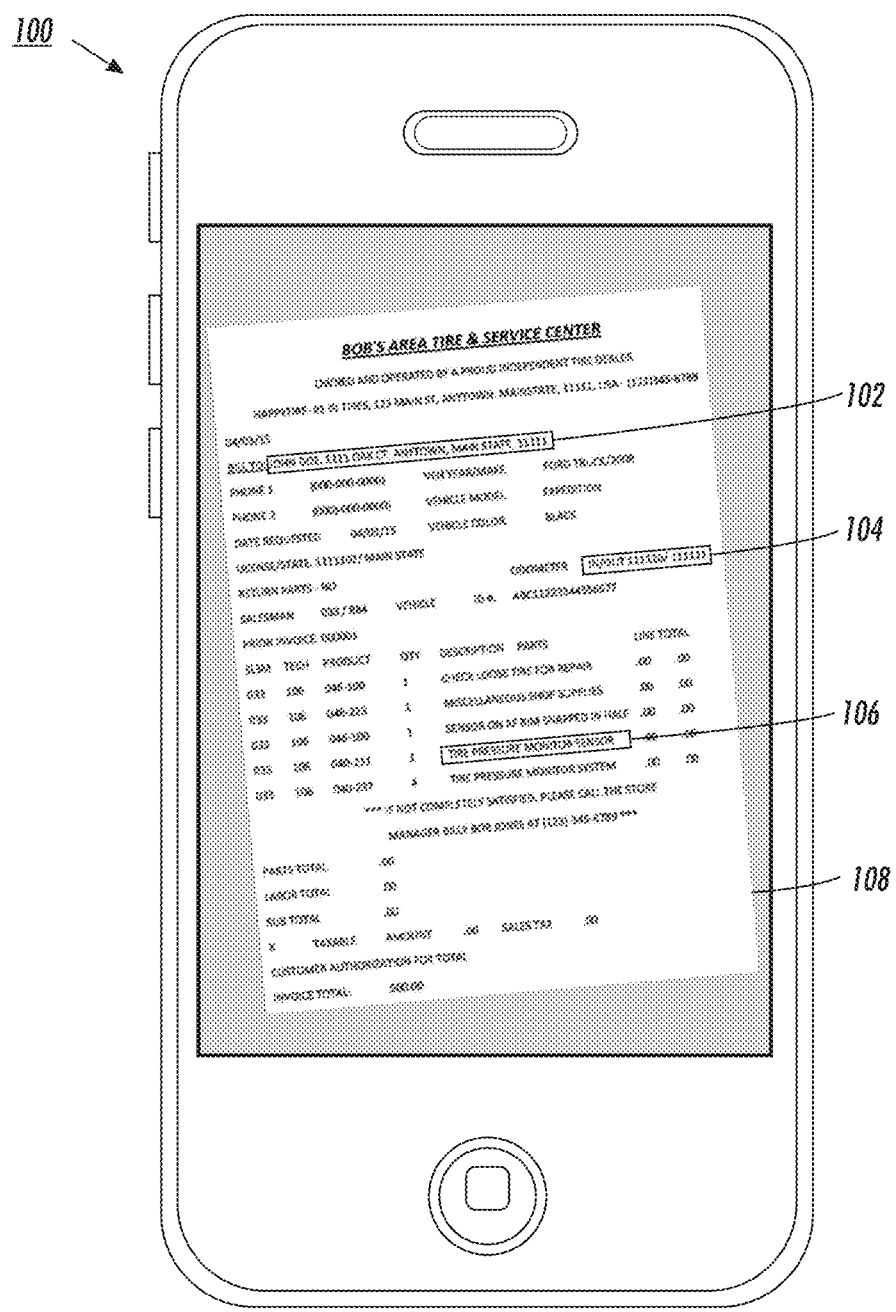
Figure 1F:
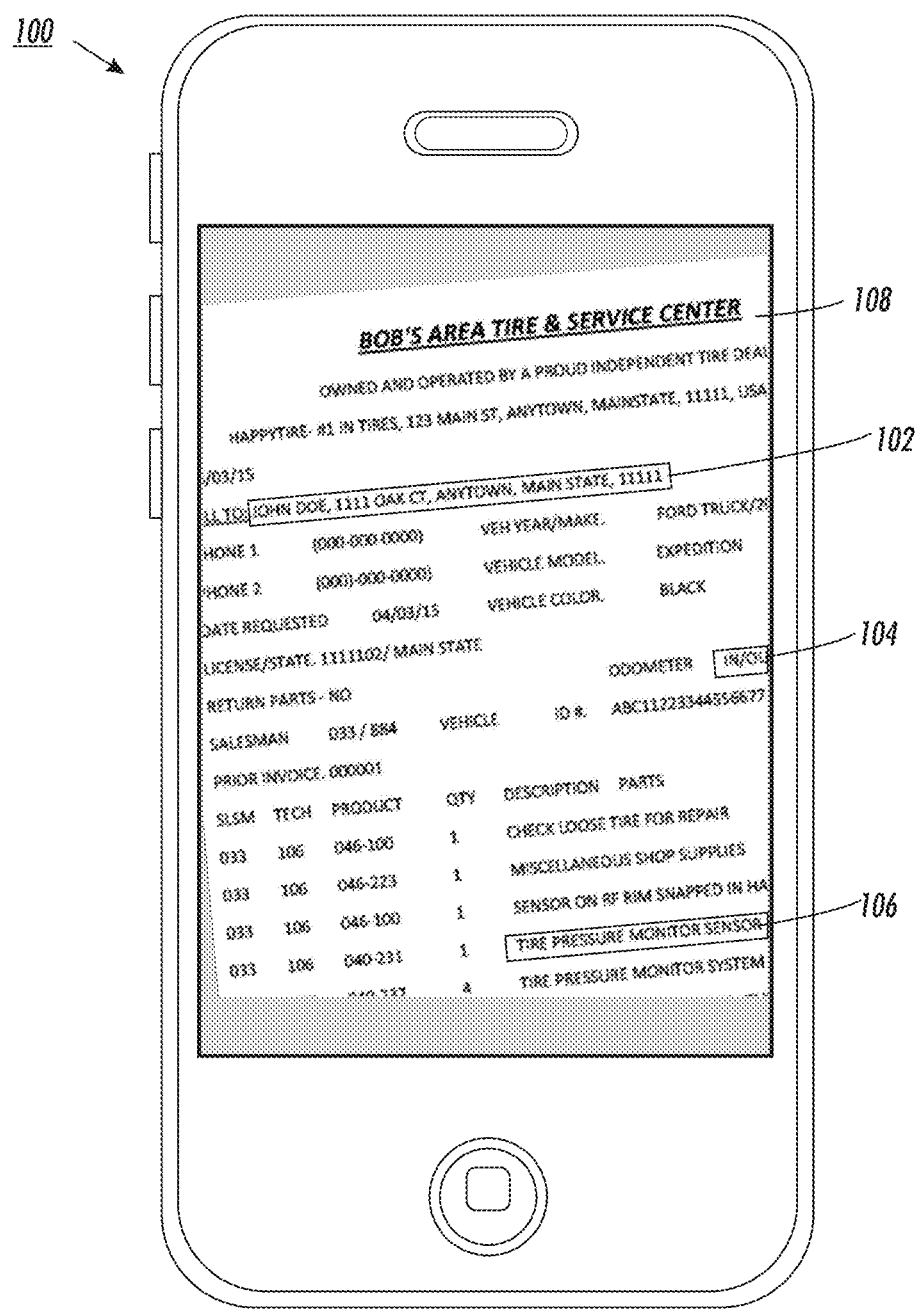
Figure 1G:
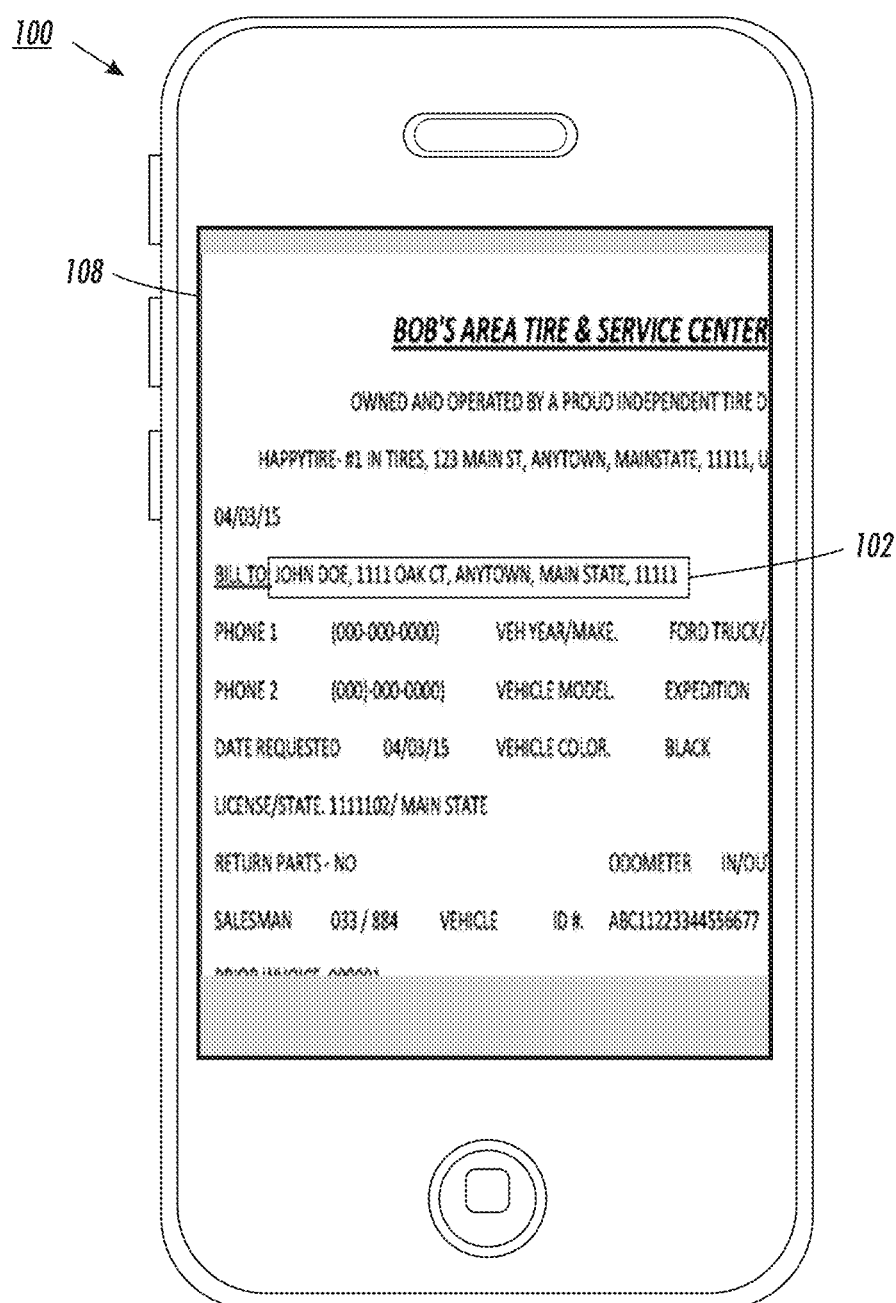
Figure 1H:
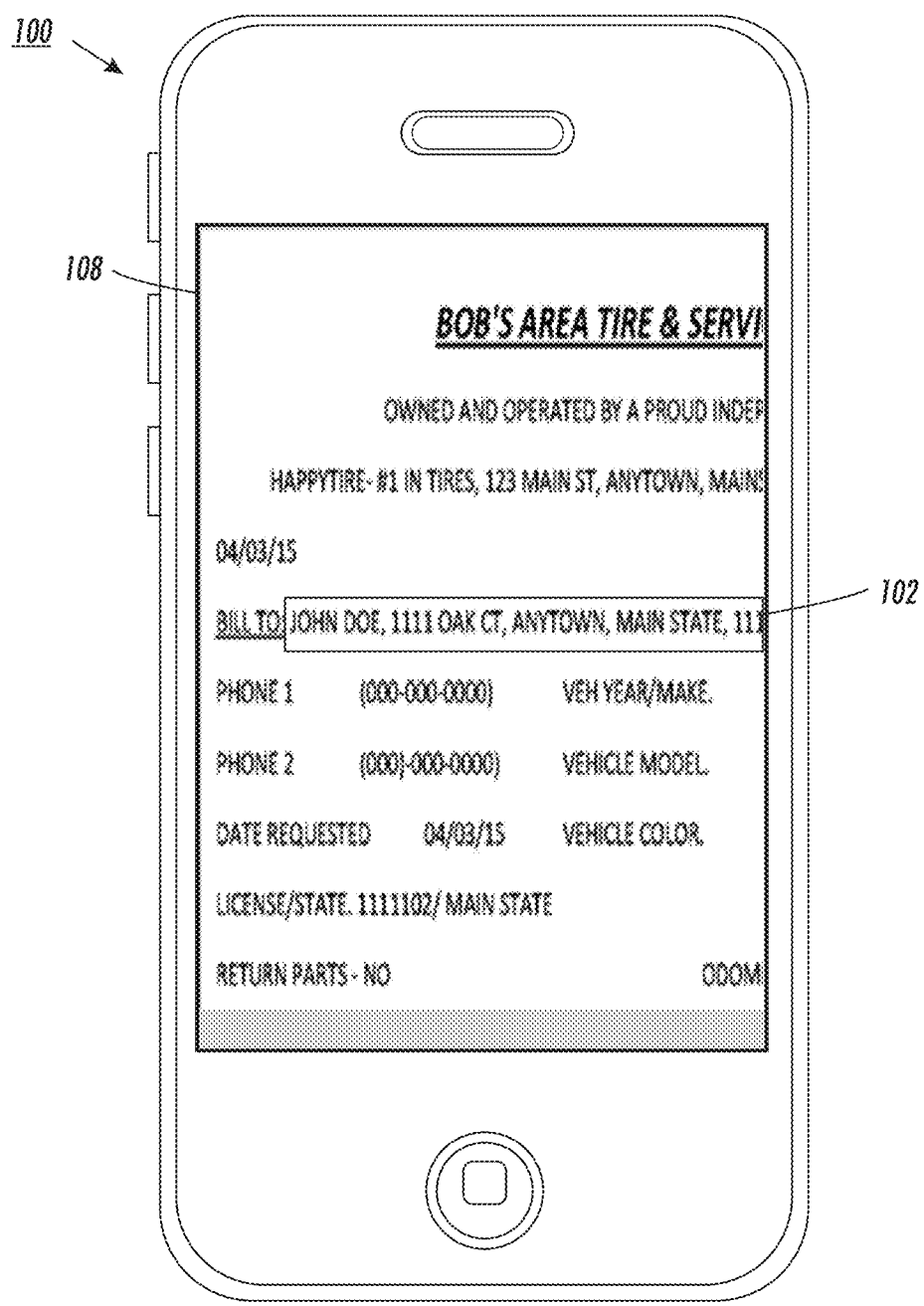
Figure 1I:
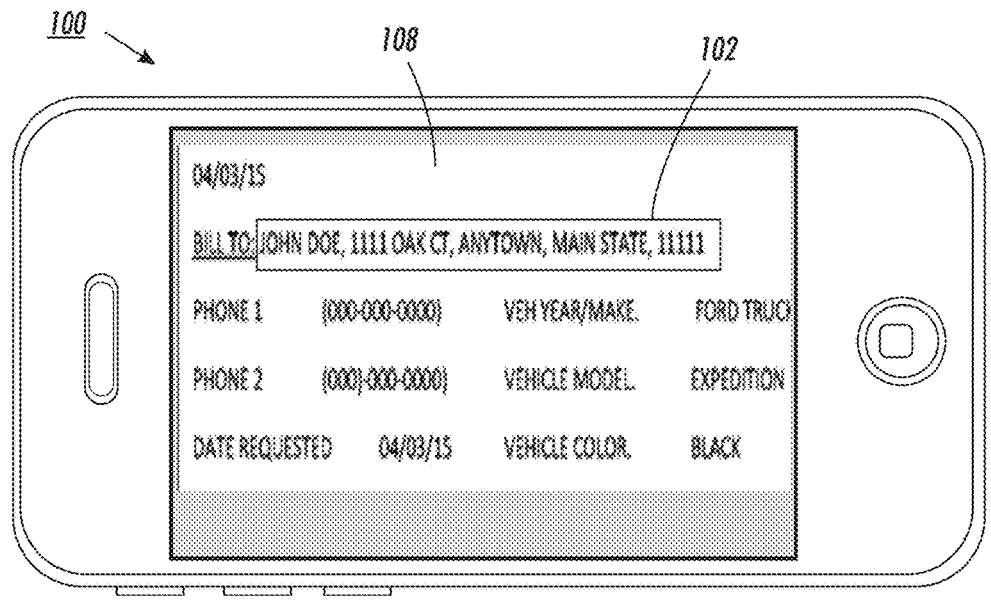

More specifically, FIG. 1E illustrates the full item 108 being within the view of the camera, and FIGS. 1F-1I illustrate successively zoomed-in images, where successively less and less of the item 108 takes up the entire field of view of the camera of the device 100. This occurs by the user either moving the camera of the device 100 closer to the item 108, or by the user changing the magnification of the camera of the device 100 to cause more of item 100 to take up the entire field of view of the camera. This zoom in process produces an electronic image with a relatively larger feature size sufficient to provide relatively higher quality optical character recognition of the name and address field 102 is shown in FIG. 1I.

Figure 1J:
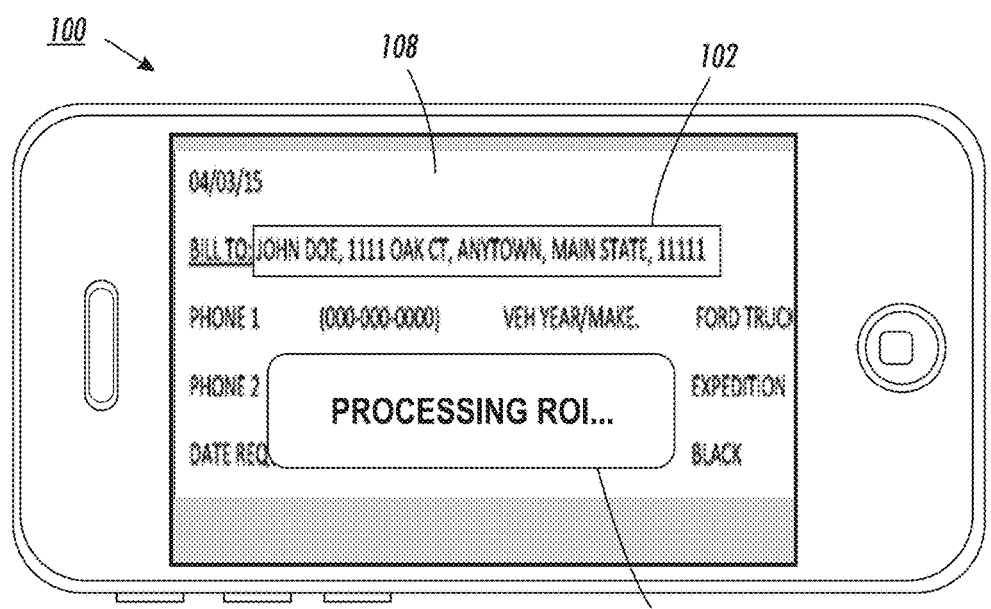

Thus, as shown above, such methods and systems automatically recognize features of the item 108 from a full-view video frame of the continuous video (e.g., FIG. 1D that was obtained when the entire item 108 was within the field of view of the camera) using a processor in communication with the device's 100 camera. The methods also automatically recognize patterns (item 102 in FIG. 1I) from a zoom-in video frame of the continuous video (e.g., that was obtained when only a portion of the item occupied the field of view of the camera, as seen in FIG. 1I) using the processor. Again, because the resolution of the user's portable device is limited, the full-view video frame (FIG. 1D) is of insufficient quality to reliably recognize patterns, but is of sufficient quality to recognize the identified features and categorize the item; however, the relatively larger feature size of the zoom-in video frame shown in FIG. 1I is sufficient to provide high-quality optical character recognition. These methods can also inform the user that processing is being performed on the Region of Interest that has been zoomed-in on using the continuous video (FIG. 1J, item 116).

These systems and methods can use the document category and identified features 102, 104, 106, and/or the patterns to determine whether the item 102 is valid or genuine. In the authentication process, these methods classify the item based on features in the full-view image, and can determine whether the item is valid based on the classification of the item matching a valid classification. Additionally, to include recognize patterns in the verification process, the methods and systems herein can cause the graphic user interface of the device 100 to display an information box (item 118, FIG. 1K) on the graphic user interface of the device 100.

Figure 1K:
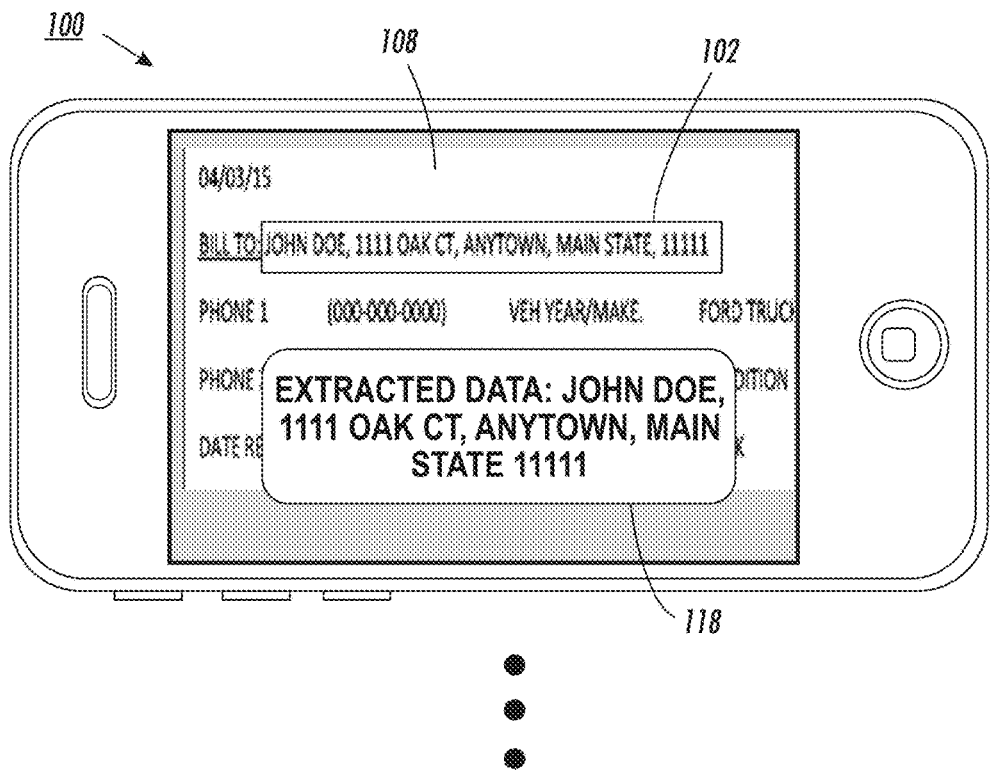
Figure 1L:
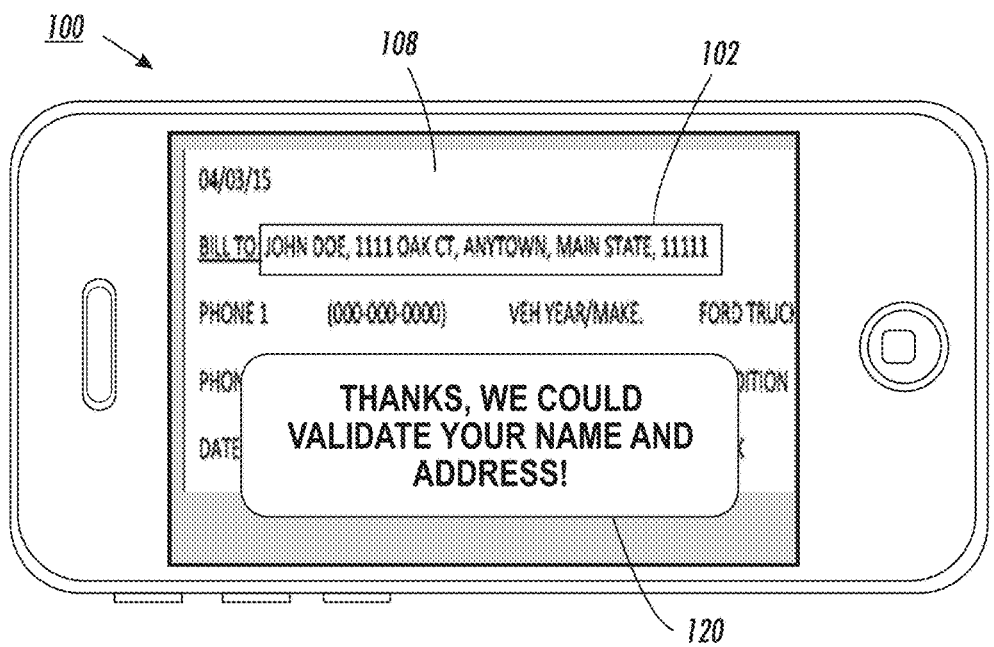

More specifically, as shown in FIG. 1K, the information box 118 displays the automatically optically character recognized patterns from item 102. The systems and methods herein then compare the automatically recognized characters to a known database (e.g., a user account that maintains user information) to verify whether the item properly relates to the user. If the data from the optical character recognition matches the expected data within the user's account, then, as shown in FIG. 1L, the systems and methods herein cause the device 100 to display process a confirmation 120 to the user, that the processing of the Region of Interest (item 102) was correct and that the information in item 102 has been validated.

While one very limited example of authorization of a document based on a single name/address field is discussed above, those ordinarily skills in the art would understand that many different forms of authorization/validation are useful with the systems in methods herein. For example, the systems and methods herein can verify whether the optically recognized characters would be included within the category of document. Therefore, if non-conforming data types (e.g., ages, social security numbers, bank account numbers, etc.) were found in an "automobile service invoice" category of document, systems and methods herein would indicate such an abnormality and provide a warning to the user. In another example, if the photograph of a user ID document is inconsistent with the optically character recognize name on the user ID (based on comparisons with known records), the document can be considered invalid, and a warning can similarly be issued by the systems and methods herein. All other forms of document verification that evaluate consistency between a document type (category) and the optically recognized data contained within the document are equally useful by the systems and methods herein.

The authentication process also determines whether the zoom-in video frame is actually of the item 108 based on whether the continuous video is unbroken between the full-view frame (FIG. 1D) and the zoom-in frame (FIG. 1I). This is shown in FIGS. 2A-2D where the user has moved the camera on the device 100 away from the item 108 in FIGS. 2A and 2B, and in FIG. 2C moves the camera so that none (or only an insignificant portion) of the item remains within the field of view in at least some of the video frames.

Figure 2A:
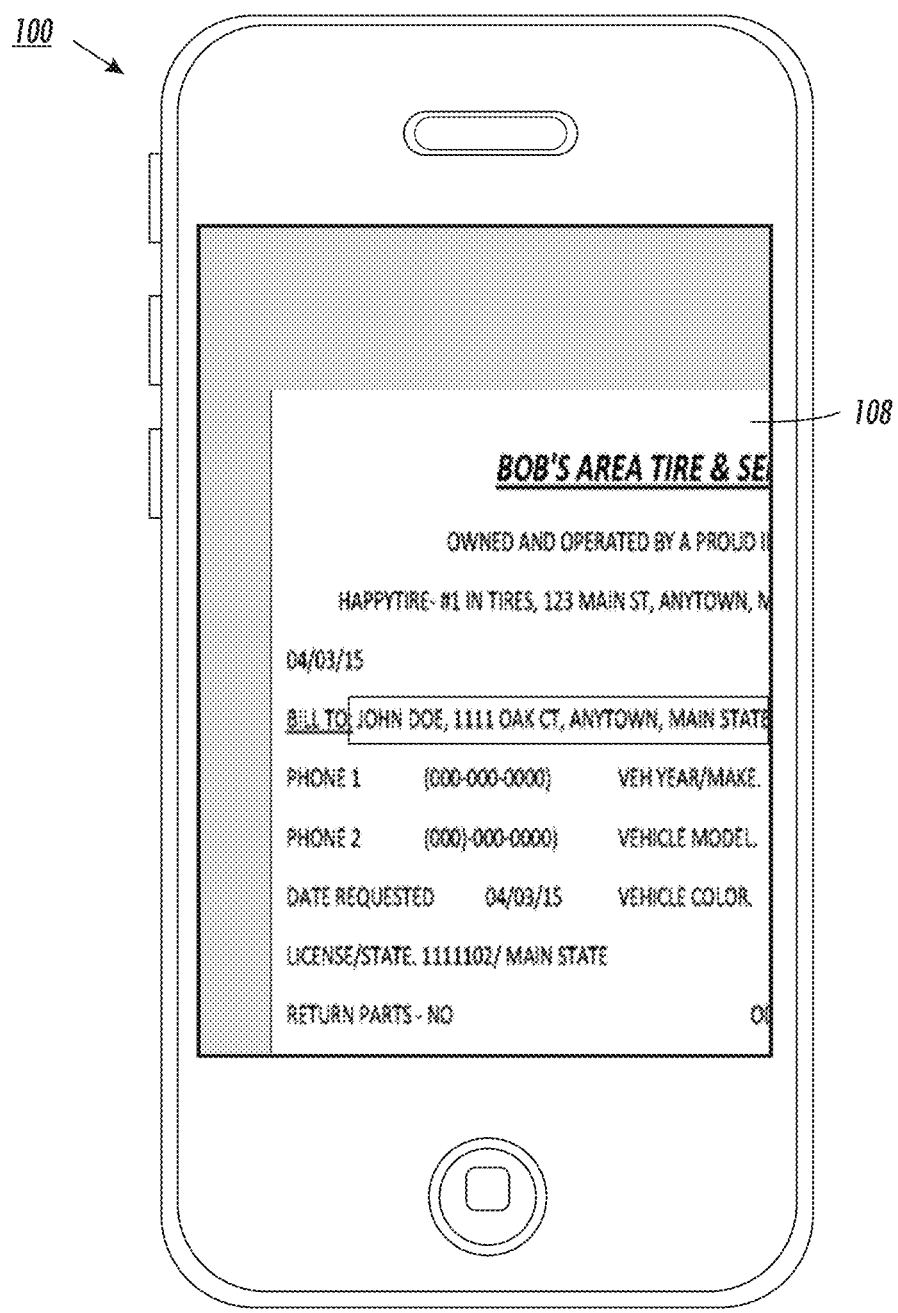
FIGS. 2A-2D are schematic diagrams illustrating devices and processes performed herein.
Figure 2B:
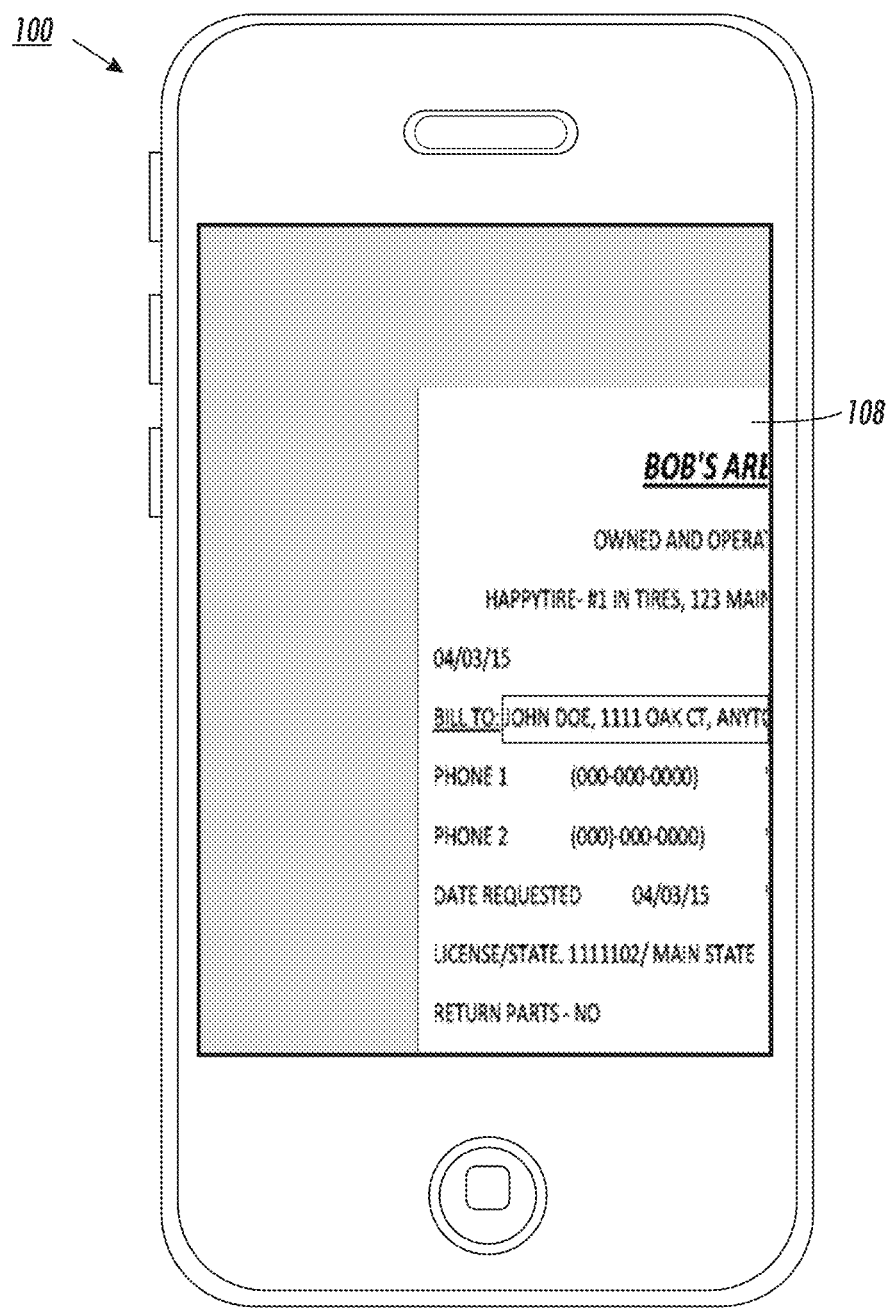
Figure 2C:
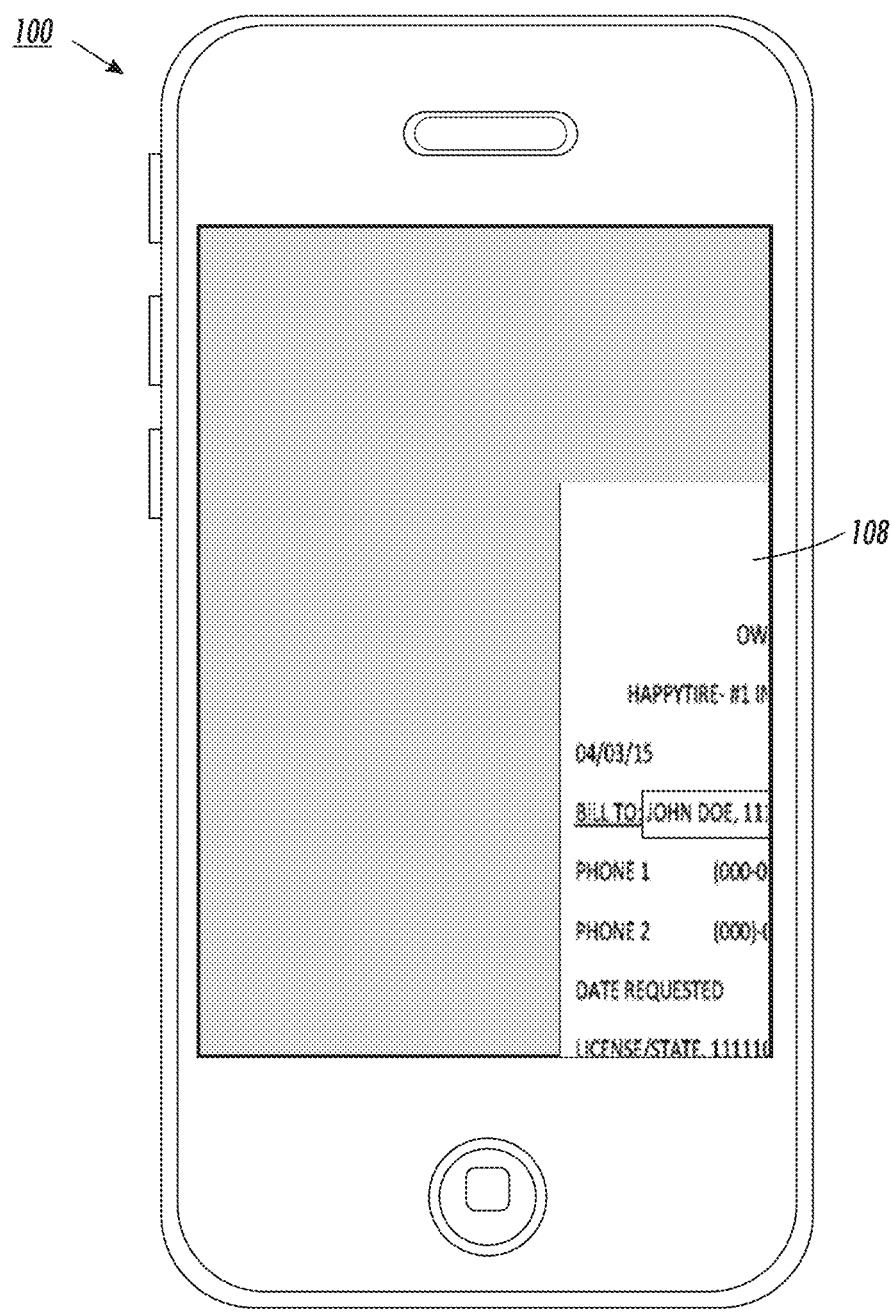
Figure 2D:
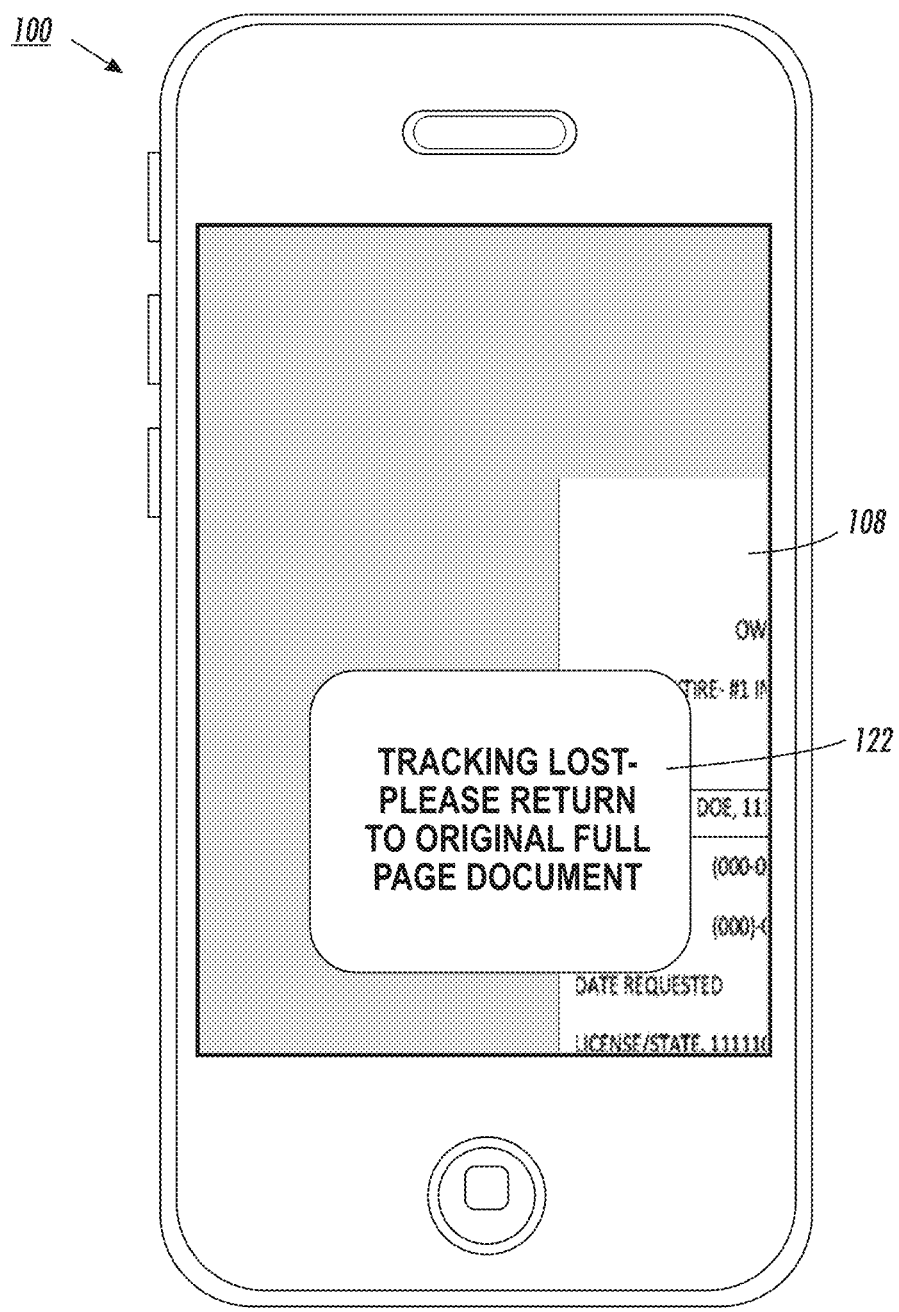
Figure 3A:
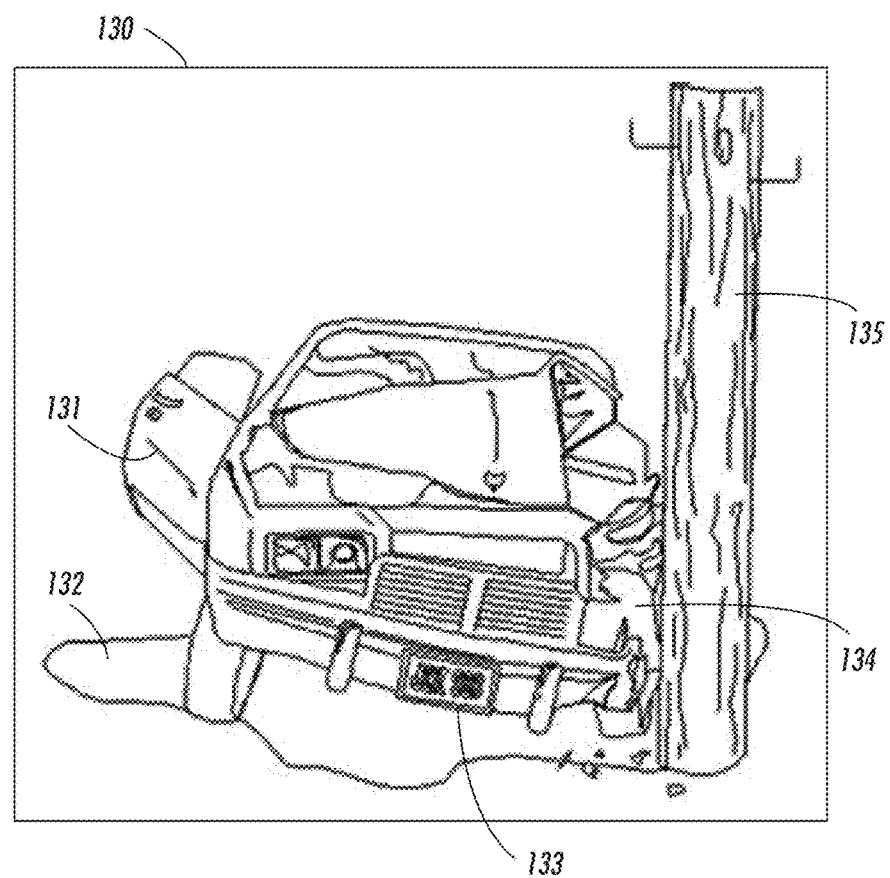
FIGS. 3A-3D are schematic diagrams illustrating different images of a scene processed by devices and methods herein.
Figure 3B:
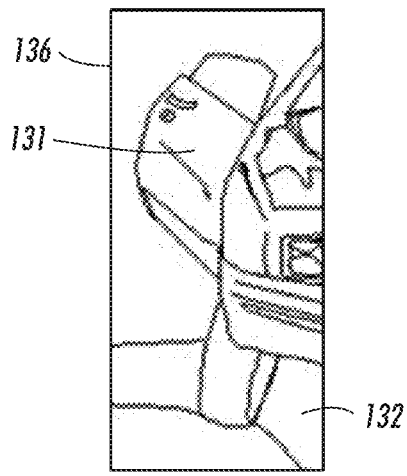
Figure 3C:
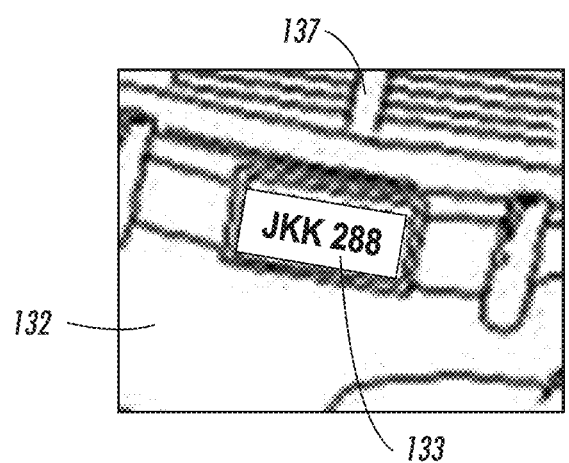
Figure 3D:
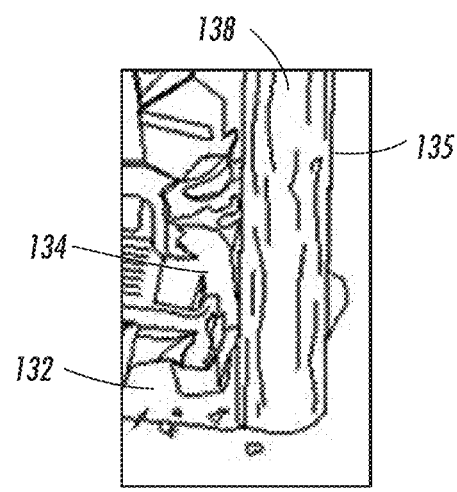

When the entire item 108 is removed from the field of view, or only a statistically insignificant portion (e.g., less than 10%) of the item 108 remains in the field of view, the systems and methods herein identify a break in the continuous video frames of the full page item 108. When this occurs the systems and methods herein cause the graphic user interface of the device 100 to display an information box 122, as shown in FIG. 2D, informing the user that the video tracking has been lost on the full page item 108. Further, such an information box 122 instructs the user to return the continuous video frame to the view of the full-page item 108.

In other words, these systems and methods monitor the video for continuity (in order to determine whether the video is discontinuous between the full-view frame and the zoom-in frame) to ensure that the continuous video always maintains a significant portion of the item. If the video is found to be discontinuous (not unbroken), the methods cause the graphic user interface to repeat the initial instruction 101 (FIG. 1A) to begin again with the full-view image of the entire item, and subsequently repeat the subsequent instructions 114 (FIG. 1D) to obtain the zoom-in image.

As shown in FIGS. 3A-3D, other methods herein validate groups of individual images as coming from the same document or the same scene. More specifically, the systems and methods cause the graphic user interface of the user's portable device to display an initial instruction to obtain a full-view still (non-video, non-moving series of images) electronic image that positions the entire item within the field of view of a camera of the device. After displaying the initial instruction, these methods cause the graphic user interface to display a subsequent instruction to obtain one or more zoom-in images that position only a portion of the item within the field of view of the camera.

These methods automatically recognize features of the full-view image, using a processor in communication with the camera, and automatically recognize the patterns and or/features from the zoom-in image as shown in FIG. 3A-3D. The methods can be used to recognize individual features of a video or picture of natural scene, instead of a document. In this example, in FIG. 3A, the full-view still electronic image 130 is of a car having crashed into a pole 135. The method prompts the user to obtain this full view still electronic image of the scene (item 130) and in doing so will automatically record defining features of the natural scene (such as the broken door 131, oil spill 132, license plate 133, smashed corner 134, and wooden pole 135).

More specifically, this processing analyzes each of the zoom-in still images 136-138 for continuity with the full-view still image 130 based on an overlap of image features 131-135 between the full-view image and the zoom-in image on a pixel comparison basis, and this identifies whether the zoom-in images 131-135 are continuous or discontinuous with the full-view image 130. For example in image 136 in FIG. 3B, which is a zoomed-in view of the broken door 131, the oil spill 132 is visible and is consistent with the oil spill 132 in image 130 in FIG. 3A. In view of this continuity of the oil spill 132, the systems and methods herein automatically determine that the broken door 131 in image 136 is the same broken door 131 displayed in the full view of the image 130.

Similarly, the continuity between the oil spill 132 in image 137 and image 130 verifies that the license plate 133 in image 137 is the same license plate shown in image 130. Because the characters in the license plate 133 shown in image 137 take up more of the field of view, the are relatively larger than those shown in image 130 and are more easily (and more accurately) recognized during an automated optical character recognition process. This is similar to the increase in optical character recognition accuracy that was discussed above for the zoomed in image in FIG. 1I, that provided characters that take up more of the field of view (and are relatively larger and provide tire optical character recognition accuracy than the characters in FIG. 1D).

Thus, the authentication process determines whether each of the zoom-in images 136-138 (FIGS. 3B-D) is actually of the same item shown in the overall image 130 (FIG. 3A) based on an overlap of image features 131-135 between the full-view image 130 and the zoom-in images 136-138. In this example, recognizing that all of the individual images 136-138 are continuous with the overall image 130 allows, for example, an insurance adjuster to know with certainty that the vehicle damage presented in the individual images 136-138 is consistent with the accident scene shown in full-view image 130, and that individual damage elements from other vehicles have not been included within the insurance claim in order to artificially increase the insurance claim. Additionally, this automatically identified continuity between the zoom out image 130 and the zoom in images 136-138 allows the vehicle identification provided by the automatically recognized license plate characters 133 in FIG. 3C to be automatically assigned to (correlated to, attributed to) the other zoom-in images 136 and 138, freeing the insurance adjuster from having to manually correlate all such photographs.

Further, while FIGS. 1A-1L illustrate a document and FIGS. 3A-3D illustrate an outdoor scene, either the video processing in FIGS. 1A-1L or the still image processing in FIGS. 3A-3D could be utilized to identify continuity (or discontinuity) between zoom-in images (or frames) and full-view images (or frames) for any type of item (document or scene).

Figure 4:
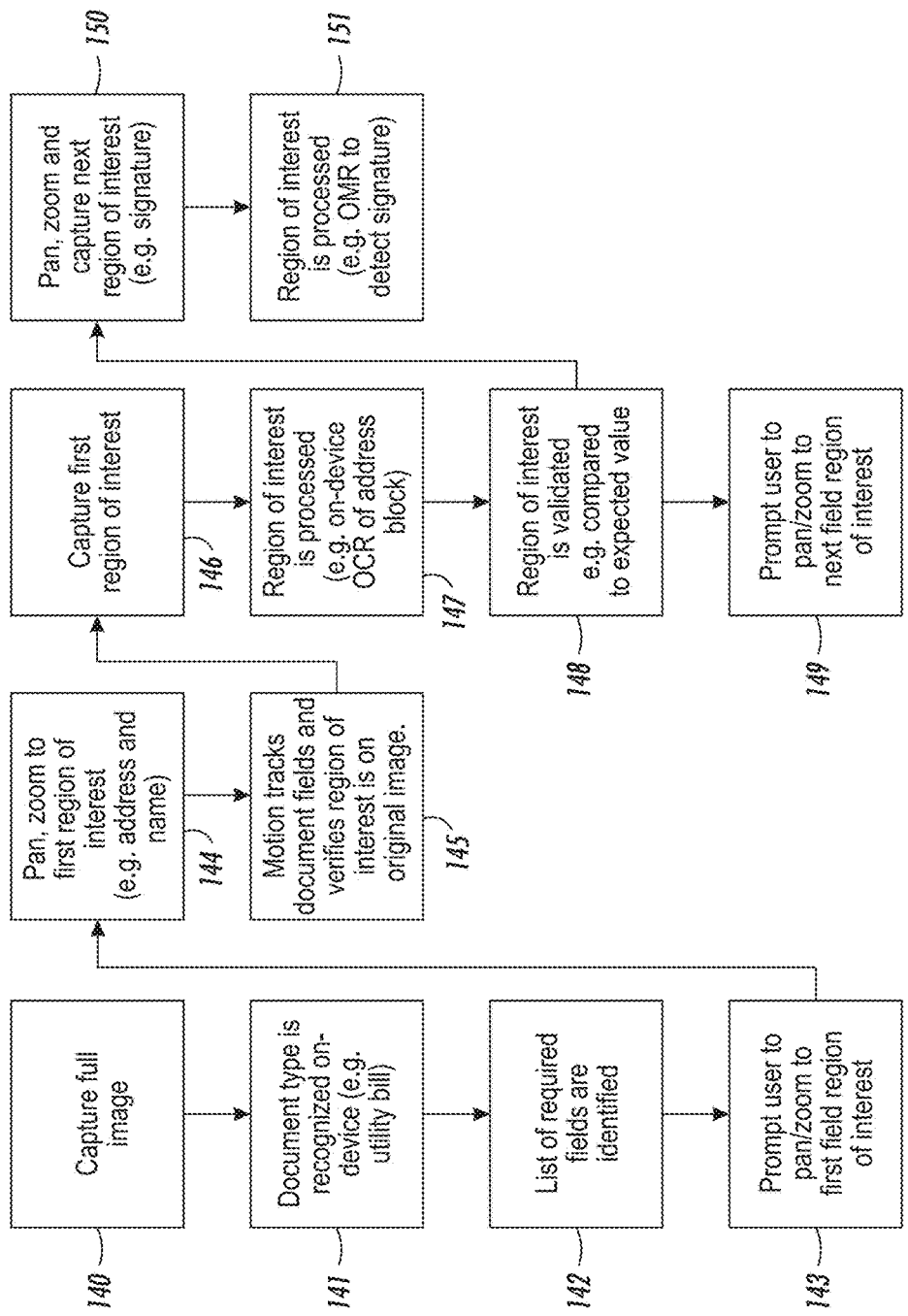
FIG. 4 is a flow diagram of various methods herein.

FIG. 4 is a flowchart that illustrates many of the processing steps that are discussed above. More specifically, after being instructed to do so (FIG. 1A, above) the user captures a full-view image of an item in item 140. From the full-view image, the document type is recognized (potentially on the portable device 100 itself). In one example, the document type can be a utility bill.

In item 142 in FIG. 4, the list of fields that will be subjected to automated recognition processing are identified based on the categorization of the document in item 141. Item 143 prompts the user to pan/zoom to the first field region of interest. This causes the user to pan/assume to the first region of interest, which in this case is the address and name field, as shown in item 144. During this process, as shown in item 145, the systems and methods herein track the movement of the document fields within the continuous video to verify that the region of interest is still within the original image captured in item 140.

After the panning and zooming, in item 146, the first region of interest is captured. As shown in item 147, the region of interest is subjected to optical character recognition processing. In this example in item 147, the address is subjected to optical character recognition processing, potentially performed on the user's device 100. The results from the optical character recognition in item 147 are validated by being compared to an expected value in item 148.

Subsequently, the user is instructed to pan/zoom to the next field region of interest in item 149. Following this instruction, the user pans/zooms and captures the next region of interest, which can be for example a signature field. This region of interest is then processed (e.g., optical mark recognition (OMR) to detect signature) as shown in item 151.

Figure 5C:
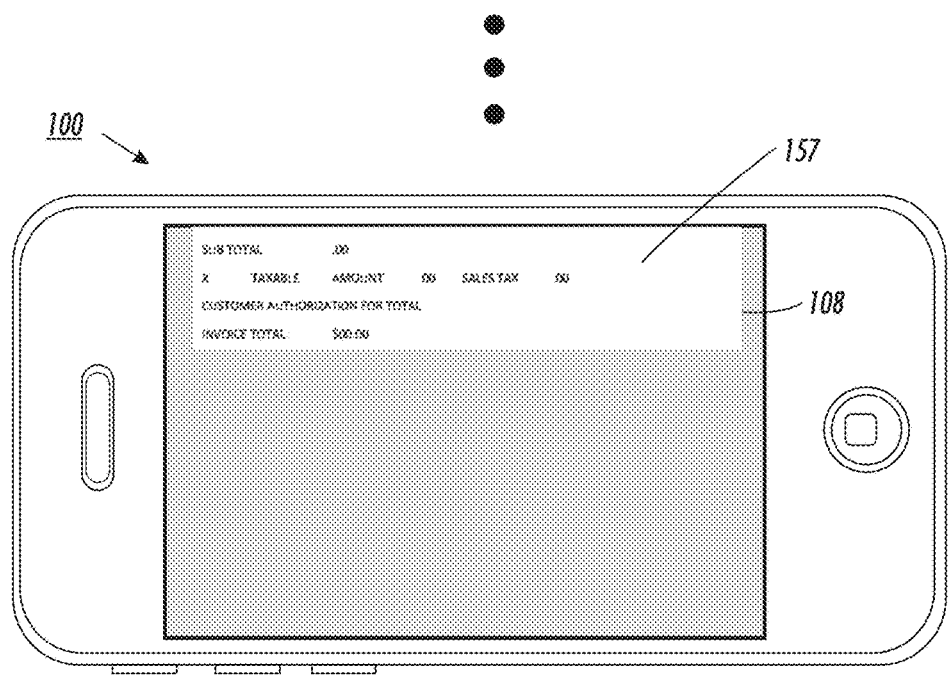

FIGS. 5A-5D illustrate an image stitching feature of the systems and methods herein that utilizes still images/video continuity to validate the stitched document. More specifically, the user is instructed to pass the camera of the device 100 over an item (such as the document 108 discussed above with respect to FIGS. 1A-1L) to obtain continuous video or a series of still images. FIG. 5A illustrates the upper portion 155 of the document 108 obtained within a video frame or still image; FIG. 5B illustrates the middle portion 156 of the document 108 obtained within a video frame or still image; and FIG. 5C illustrates the lower portion 157 of the document 108 obtained within a video frame or still image. FIG. 5D illustrates the individual video frames or still images 155-157 stitched (combined) together electronically into a single image.

The systems and methods herein use video continuity to verify that each individual video frame 155-157 is part of the same document 108 using the processing shown in FIGS. 2A-2D. More specifically, if the entire item 108 is removed from the field of view, or only a statistically insignificant portion (e.g., less than 10%) of the item 108 remains in the field of view, the systems and methods herein identify a break in the continuous video frame of the full page item 108. When this occurs the systems and methods herein cause the graphic user interface of the device 100 to inform the user that the video tracking has been lost on the full page item 108. Further, such information instructs the user to return the top of the document 155 to being the continuous video acquisition. Additionally (or alternatively) systems and methods herein can verify that each individual video frame 155-157 is part of the same document 108 based on an overlap of image features, as was discussed above with respect to FIGS. 3A-3D.

Figure 6:
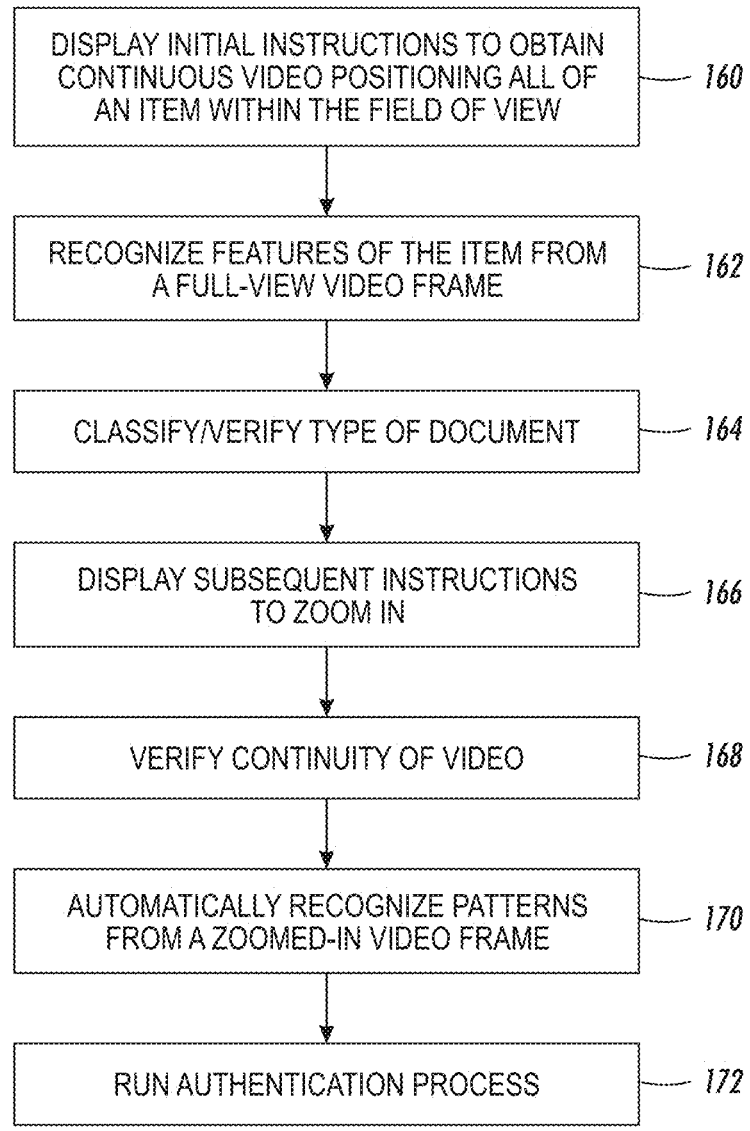
FIG. 6 is a schematic diagram illustrating a stitched image of a document processed by devices and methods herein.

FIG. 6 is flowchart illustrating other methods herein. Again, these methods can be executed using, for example, a program of instructions (an "app") running on a portable device, such as a user's smartphone. As shown in item 160 in FIG. 6, these methods cause the graphic user interface of a device (such as a portable device or smartphone) to display initial instructions to the user to obtain continuous video that initially positions all of an item or document within the field of view of the camera on the device (e.g., so the entire document is captured in the continuous video recording).

In item 162 in FIG. 6, these methods automatically recognize features of the document from a full-view video frame of the continuous video (e.g., that was obtained when the entire item was within the field of view of the camera) using a processor in communication with the device's camera. In item 164, these methods also classify the item based on the identified features to determine what type of document is in the full-view frame (and can initially determine whether the item is valid based on whether the classification of the item matches a valid classification).

After the initial instructions are displayed in item 160, the methods cause the graphic user interface to display subsequent instructions, in item 166, to zoom in on one or more portions of the item (e.g., so as to position only a portion of the item within most or all of the field of view of the camera) while continuing to obtain the continuous video recording (without stopping the continuous video recording).

In item 168, the process also determines whether the zoom-in video frame is actually of the item based on whether the continuous video is unbroken between the full-view frame and the zoom-in frame. In other words, in item 168 these methods monitor the video for continuity (in order to determine whether the video is discontinuous between the full-view frame and the zoom-in frame). If the video is found to be discontinuous (not unbroken) after displaying the subsequent instruction 166, the methods cause the graphic user interface to repeat the initial instruction 160 to begin again with the full-view image of the entire item, and subsequently repeat the subsequent instructions 166 to obtain the zoom-in image.

The methods also automatically recognize patterns in item 170 from a zoom-in video frame of the continuous video (e.g., that was obtained when only a portion of the item occupied the field of view of the camera) using the processor. Because the scanning ability of the user's portable device is limited, the full-view video frame is of insufficient quality to reliably recognize patterns, but is of sufficient quality to recognize the identified features in item 162.

In item 172, these methods perform an authentication process that can use both the identified features and the patterns to determine whether the item is valid. In the authentication process in item 172, these methods can determine whether the item is valid based on the classification of the item matching a valid, previously known classification, and based on the patterns matching known, previously validated data. The authentication process in item 172 can be performed entirely locally on the portable device that is used to obtain the images (if the item classification data and the known, previously validated data are stored within storage of the portable device) or such authentication data can be remotely stored in one or more databases of one or more remote servers and accessed through any convenient network accessible by the portable device.

Figure 7:
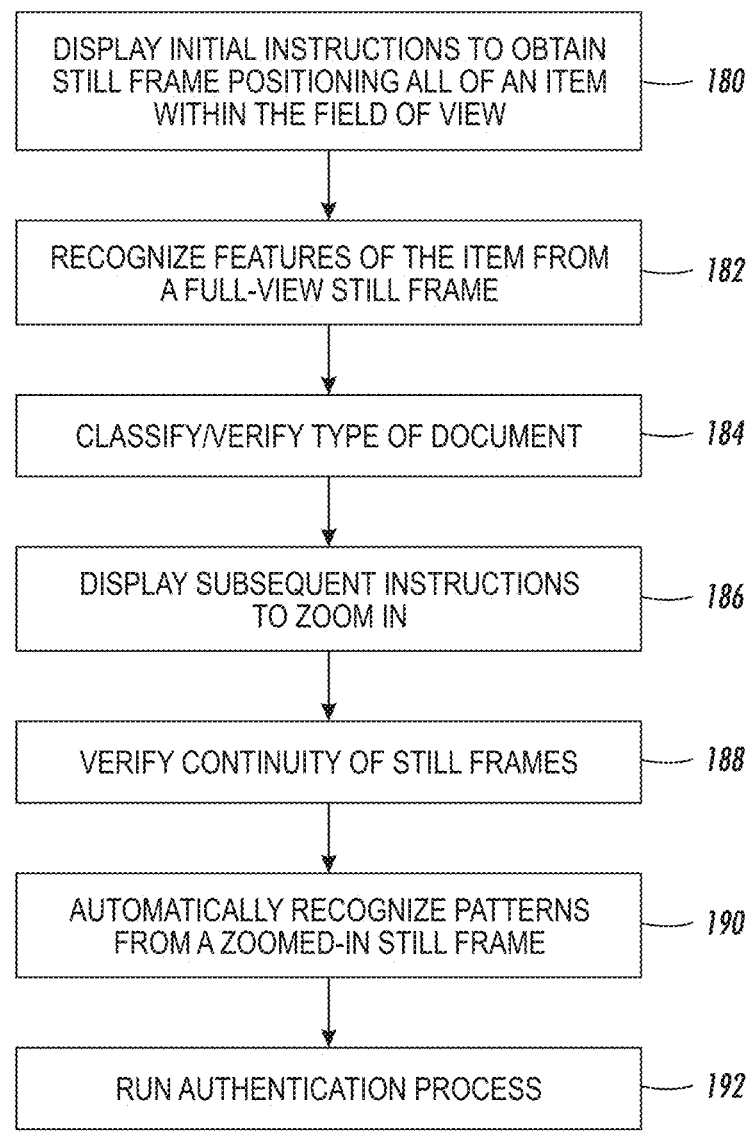
FIG. 7 is a flow diagram of various methods herein.

Another flowchart shown in FIG. 7 illustrates other aspects performed by the systems and methods herein. In item 180 shown in FIG. 7, the methods cause the graphic user interface of the user's portable device to display an initial instruction to obtain a full-view still image that positions all of the item within the field of view of a camera of the device.

Similar to the processing discussed above, in item 182, these methods can also automatically recognize features of the document from a full-view still image using a processor in communication with the device's camera. In item 184, This process can also classify the item based on the identified features to determine what type of document is in the full-view still image (and can initially determine whether the item is valid based on whether the classification of the item matches a valid classification).

After displaying the initial instruction 180, these methods cause the graphic user interface to display a subsequent instruction 186 to obtain a zoom-in still image that positions only a portion of the item within the field of view of the camera.

In item 188, this process also determines whether the zoom-in image is actually of the item based on an overlap of image features between the full-view image and the zoom-in image. More specifically, in item 188 this processing evaluates the zoom-in image for continuity with the full-view image based on an overlap of image features between the full-view image and the zoom-in image, and this identifies whether the zoom-in image is discontinuous with the full-view image. If the zoom-in image is found to be discontinuous with the full-view image after displaying the subsequent instruction 186, the methods cause the graphic user interface to repeat the initial instruction 180 to again obtain a full-view image of the entire item, and subsequently repeat the subsequent instructions 186 to obtain the zoom-in image.

These methods also automatically recognize the patterns from the zoom-in still image in item 190. In item 192, such methods also perform an authentication process using both the identified features and the patterns to determine whether the item is valid. In the authentication process in item 192, these methods can determine whether the item is valid based on the classification of the item matching a valid classification, and based on the patterns matching known, previously validated data. The authentication process in item 192 can be performed entirely locally on the portable device that is used to obtain the images (if the item classification data and the known, previously validated data are stored within storage of the portable device) or such authentication data can be remotely stored in one or more databases of one or more remote servers and accessed through any convenient network accessible by the portable device.

As would be understood by one ordinarily skilled in the art, the processes described herein cannot be performed by human alone (or one operating with a pen and a pad of paper) and instead such processes can only be performed by a machine that has the ability to obtain images (e.g., a camera) that has the ability to displays such images on a graphic user interface (e.g., a smartphone) that has the ability to electronically communicate over a network with other computerized devices, etc. Similarly, the automated character recognition processes that identify patterns within images obtained by a camera are based on pixel processing that is impossible to be performed by humans because such an involves the manipulation of electronically stored pixel information, which is information that is only capable of being processed by machines (as humans cannot process electronically obtained and stored pixel data).

Further, such machine-only processes are not mere "post-solution activity" because the machine-based steps are integral with the entire method. For example, the method begins by obtaining electronic images or video (using a machine (e.g., a camera or scanner)); the method automatically recognizes features within the electronic images by processing the pixels that are represented by electronic charges within electronic storage devices (using pixel processing machines); the methods obtain zoomed-in electronic images (using a machine); the method automatically recognizes patterns within the electronic images (using a machine); etc. Therefore, the machine is not merely added at the end of an otherwise human processing method; but instead, the machines are integral with most of the processing steps of the methods herein. Therefore, instead of taking an otherwise purely manual process and performing it on a machine, the methods herein cannot be performed without machines, and the machines are integral to the majority of the processing steps of the methods described herein.

Additionally, the methods herein solve many highly complex technological problems. For example, as mentioned above, scanning, extraction and validation using portable computing devices such as personal computers, tablets, smartphones, etc., suffers from lack of quality and consistency. Image quality of the cameras included within portable computing devices varies greatly, and is generally not sufficient to allow both full-page item recognition simultaneously with fine-grained OCR capabilities for useful metadata fields. For example, with a capture of an image of a full-page document using a smartphone, it would be unlikely to achieve the required recognition accuracy using common OCR programs. Methods herein solve this technological problem by combining video motion tracking and image categorization to improve the quality of document capture and perform automatic processing and validation of documents, when both the full document and specific Regions of Interest are used in the processing. This reduces the amount of electronic storage that a provider must maintain because scanning and processing can be done remotely on user's devices, and also reduces the amount of transportation and storage machines needed when paper documents are processed in bulk by scanning centers. By granting such benefits, the methods herein reduce the amount and complexity of hardware and software, transportation equipment, paper storage equipment, etc., needed to be purchased, installed, and maintained by providers, thereby solving a substantial technological problem that providers experience today.

Similarly, with respect to the users, the methods herein additionally solve many technological problems related to the delay and effort associated with sending paper documents to scanning centers. By limiting the need for the user to process paper items through scanning centers, the ease of use is increased and turn-around time for the user can be substantially reduced.

Figure 8:
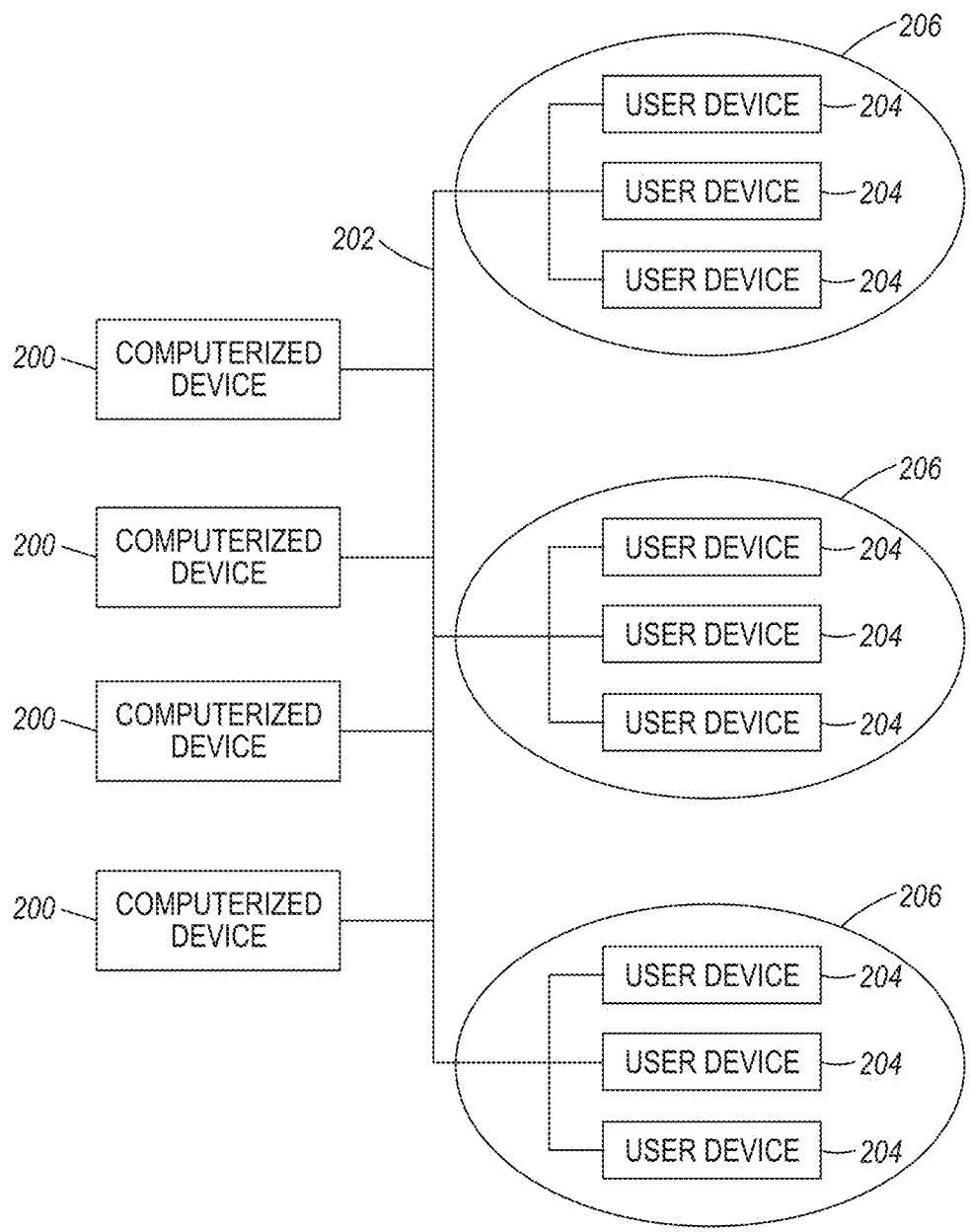
FIG. 8 is a schematic diagram illustrating systems herein.

As shown in FIG. 8, exemplary systems and methods herein include various computerized devices 200, 204 located at various different physical locations 206. The computerized devices 200, 204 can include servers, user devices, personal digital assistants, smartphones, tablet computers, personal computers, etc., and are in communication (operatively connected to one another) by way of a local or wide area (wired or wireless) network 202.

Figure 9:
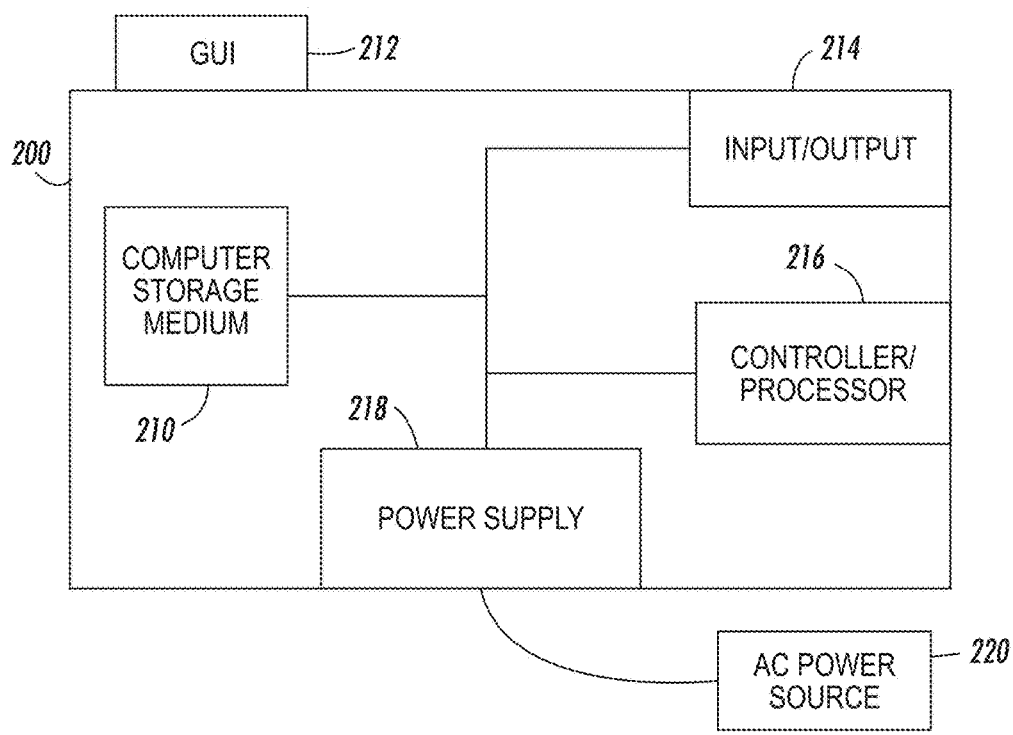
FIG. 9 is a schematic diagram illustrating devices herein.

FIG. 9 illustrates one limited example of a computerized device 200, which can be used with systems and methods herein and can comprise, for example, a server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing 200 has one or more functional components that operate on power supplied from an alternating current (AC) source 220 by the power supply 218. The power supply 218 can comprise a common power conversion unit, power storage element (e.g., a battery, etc), etc.

Figure 10:
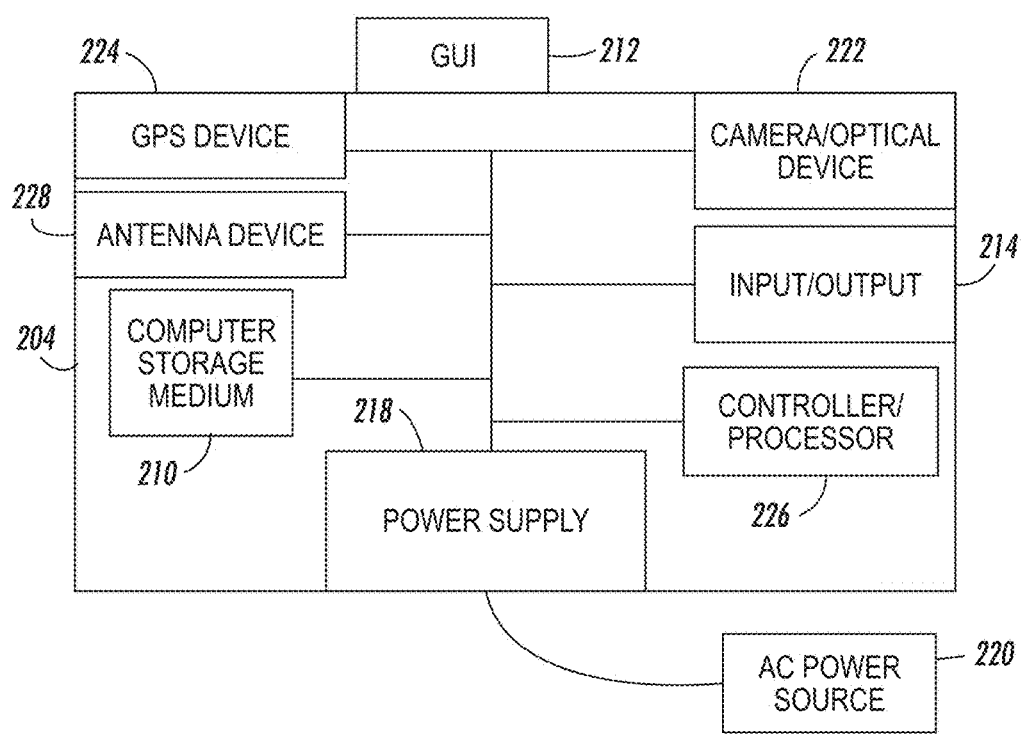
FIG. 10 is a schematic diagram illustrating devices herein.

FIG. 10 also illustrates a computerized device 204, such as a portable computerized device, which includes many of the components mentioned above in FIG. 9 (and similar items are provided the same reference numeral in the drawings). The portable computing device 204 shown in FIG. 10 can comprise, for example, a special-use device such as a smartphone, tablet, or other special-purpose portable computerized element that is easily carried by a user. Such devices are special-purpose devices distinguished from general-purpose computers because such devices include specialized hardware, such as: specialized processors 226 (e.g., containing specialized filters, buffers, application specific integrated circuits (ASICs), ports, etc.) that are specialized for phone communications, for electronic image processing, for use with cellular networks, etc.; specialized graphic user interfaces 212 (that are specialized for reduced power consumption, reduced size, antiglare, etc.); antenna 228 (that are specialized for phone communications, for use with cellular networks, etc.); specialized converters; GPS equipment 224; cameras and optical devices 222 (that are specialized for obtaining images with camera components); specialized batteries; specialized protective cases for use in harsh environments; etc.

Therefore, FIGS. 8-10 illustrate exemplary systems herein that include an application (that is symbolically represented in the drawings as item 210, as the app comprises a series of instructions stored in memory 210) operating on a device 200, 204, such as a user's portable device (e.g., a smartphone) 204. The series of instructions (the app) within the device's electronic memory 210 causes the processor 216, 226 to electronically control the operations of various electronic and optical components described herein.

The user's portable device 204 has limited scanning capabilities (a camera 222 having a lower resolution than an OCR flatbed scanner). The application 210 causes a graphic user interface 212 of the device to display an initial instruction to obtain continuous video that positions all of an item within the field of view of a camera 222 of the device. The application 210 also automatically recognizes identified features of the item from a full-view video frame of the continuous video (e.g., obtained when all of the item was within the field of view of the camera 222) using a processor 216, 226 in communication with the camera 222. The application 210 classifies the item based on the identified features to determine what type of document is in the full-view frame (and can initially determine whether the item is valid based on whether the classification of the item matches a valid classification).

After displaying the initial instruction, the application 210 causes the graphic user interface 212 to display a subsequent instruction to zoom in on the item and position only a portion of the item within some or all of the field of view of the camera 222 while continuing to obtain the continuous video. The application 210 further automatically recognizes patterns from a zoom-in video frame of the continuous video (obtained when only the portion of the item occupied the field of view of the camera 222) using the processor 216, 226.

Additionally, the application 210 performs an authentication process using the identified features and the patterns to determine whether the item is valid, using the processor 216, 226. In the authentication process, the application 210 can determine whether the item is valid based on the classification of the item matching a valid classification, based on the patterns matching known, previously validated data, and based on the patterns matching the automatically determined category of the document. The authentication process can be performed entirely locally on the portable device that is used to obtain the images (if the item classification data and the known, previously validated data are stored within storage 210 of the portable device 204) or such authentication data can be remotely stored in one or more databases of one or more remote servers 200 and accessed through any convenient network 202 accessible by the portable device 204.

Other systems herein include an application 210 operating on a device, such as a user's portable device (e.g., a smartphone) that has limited scanning capabilities (a camera 222 having a lower resolution than a flatbed scanner). The application 210 causes a graphic user interface 212 of the device to display an initial instruction to obtain a still image that positions all of an item within the field of view of a camera 222 of the device. The application 210 also automatically recognizes identified features of the item from a full-view still image (e.g., obtained when all of the item was within the field of view of the camera 222) using a processor 216, 226 in communication with the camera 222. The application 210 classifies the item based on the identified features to determine what type of document is in the full-view still image (and can initially determine whether the item is valid based on whether the classification of the item matches a valid classification).

After displaying the initial instruction, the application 210 causes the graphic user interface 212 to display a subsequent instruction to zoom in on the item and obtain a zoom-in still image of only a portion of the item (within some or all of the field of view of the camera 222). The application 210 further automatically recognizes patterns from a zoom-in still image (obtained when only the portion of the item occupied the field of view of the camera 222) using the processor 216, 226.

Additionally, the application 210 performs an authentication process using the identified features and the patterns to determine whether the item is valid, using the processor 216, 226. In the authentication process, the application 210 can determine whether the item is valid based on the classification of the item matching a valid classification, based on the patterns matching known, previously validated data, and based on the patterns matching the automatically determined category of the document. The authentication process can be performed entirely locally on the portable device that is used to obtain the images (if the item classification data and the known, previously validated data are stored within storage 210 of the portable device 204) or such authentication data can be remotely stored in one or more databases of one or more remote servers 200 and accessed through any convenient network 202 accessible by the portable device.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, the Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

A "pixel" refers to the smallest segment into which an image can be divided electronically. Received electronic pixels of an electronic image are represented by digital numbers associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method of authenticating a physical item having markings using a portable computing device comprising:

causing a graphic user interface of said portable computing device to display an initial instruction to obtain continuous video and position all of said physical item within a field of view of a camera of said portable computing device;

automatically recognizing identified features from said markings of said physical item from a full-view video frame of said continuous video obtained when all of said physical item was within said field of view of said camera, using a processor in communication with said camera;

after displaying said initial instruction, causing said graphic user interface to display a subsequent instruction to zoom in on said physical item and position only a portion of said physical item within said field of view of said camera while continuing to obtain said continuous video;

automatically recognizing patterns from a zoom in video frame of said continuous video obtained when only said portion of said physical item occupied all of said field of view of said camera, using said processor;

monitoring said continuous video for continuity while continuing to obtain said continuous video to determine whether said continuous video is continuous or discontinuous between said full-view video frame and said zoom in video frame;

repeating said initial instruction followed by said subsequent instruction when said continuous video is determined to be discontinuous; and performing an authentication process using said identified features and said patterns to determine whether said physical item is valid when said continuous video is determined to be continuous by matching said identified features and said patterns to previously validated data, using said processor.

2. The method according to claim 1, further comprising determining whether said zoom in video frame is actually of said physical item based on whether said continuous video is unbroken between said full-view video frame and said zoom in video frame.

3. The method according to claim 1, further comprising:
determining a classification of said physical item based on said identified features; and
determining whether said physical item is valid based on said classification of said physical item matching a valid classification.

4. The method according to claim 1, said full-view video frame being of insufficient quality to perform said recognizing patterns.

5. A method of authenticating a physical item having markings using a portable computing device comprising:
causing a graphic user interface of said portable computing device to display an initial instruction to obtain a full-view image and position all of said physical item within a field of view of a camera of said portable computing device;
automatically recognizing identified features from said markings of said full-view image, using a processor in communication with said camera;
after displaying said initial instruction, causing said graphic user interface to display a subsequent instruction to obtain a zoom in image that positions only a portion of said physical item within said field of view of said camera;
automatically recognizing patterns from said zoom in image, using said processor;
monitoring video from said portable computing device to determine whether said video is continuous or discontinuous between said full-view image and said zoom in image;
repeating said initial instruction followed by said subsequent instruction when said video is determined to be discontinuous; and
performing an authentication process using said identified features and said patterns to determine whether said physical item is valid when said video is determined to be continuous by matching said identified features and said patterns to previously validated data, using said processor.

6. The method according to claim 5, further comprising determining whether said zoom in image is actually of said physical item based on an overlap of image features between said full-view image and said zoom in image.

7. The method according to claim 5, further comprising:
determining a classification of said physical item based on said identified features; and
determining whether said physical item is valid based on said classification of said physical item matching a valid classification.

8. The method according to claim 5, said full-view image being of insufficient quality to perform said recognizing patterns.

9. A system for authenticating a physical item having markings using a portable computing device comprising:
an application operating on a device,
said application causing a graphic user interface of said portable computing device to display an initial instruction to obtain continuous video and position all of said physical item within a field of view of a camera of said portable computing device,
said application automatically recognizing identified features from said markings of said physical item from a full-view video frame of said continuous video obtained when all of said physical item was within said field of view of said camera, using a processor in communication with said camera,
after displaying said initial instruction, said application causing said graphic user interface to display a subsequent instruction to zoom in on said physical item and position only a portion of said physical item within said field of view of said camera while continuing to obtain said continuous video,
said application automatically recognizing patterns from a zoom in video frame of said continuous video obtained when only said portion of said physical item occupied said field of view of said camera, using said processor,
said application automatically monitoring said continuous video for continuity while continuing to obtain said continuous video to determine whether said continuous video is continuous or discontinuous between said full-view video frame and said zoom in video frame;
said application automatically repeating said initial instruction followed by said subsequent instruction when said continuous video is determined to be discontinuous, and
said application performing an authentication process using said identified features and said patterns to determine whether said physical item is valid when said continuous video is determined to be continuous by matching said identified features and said patterns to previously validated data, using said processor.

10. The system according to claim 9, said application determining whether said zoom in video frame is actually of said physical item based on whether said continuous video is unbroken between said full-view video frame and said zoom in video frame.

11. The system according to claim 9, said application determining a classification of said physical item based on said identified features, and determining whether said physical item is valid based on said classification of said physical item matching a valid classification.

12. The system according to claim 9, said full-view video frame being of insufficient quality to perform said recognizing patterns.

13. A system for authenticating a physical item having markings using a portable computing device comprising:
an application operating on a portable computing device,
said application causing a graphic user interface of portable computing device to display an initial instruction to obtain a full-view image that positions all of said physical item within a field of view of a camera of said portable computing device,
said application automatically recognizing identified features from said markings of said full-view image, using a processor in communication with said camera,
after displaying said initial instruction, said application causing said graphic user interface to display a subsequent instruction to obtain a zoom in image that positions only a portion of said physical item within said field of view of said camera,
said application automatically recognizing patterns from said zoom in image, using said processor, said application automatically monitoring video from said portable computing device to determine whether said video is continuous or discontinuous between said full-view image and said zoom in monitoring video from said portable computing device to determine whether said video is continuous or discontinuous between said full-view image and said zoom in image;

said application automatically repeating said initial instruction followed by said subsequent instruction when said video is determined to be discontinuous, and said application performing an authentication process using said identified features and said patterns to determine whether said physical item is valid when said video is determined to be continuous by matching said identified features and said patterns to previously validated data, using said processor.

14. The system according to claim 13, said application determining whether said zoom in image is actually of said physical item based on an overlap of image features between said full-view image and said zoom in image.

15. The system according to claim 13, said application determining a classification of said physical item based on said identified features, and determining whether said physical item is valid based on said classification of said physical item matching a valid classification.

16. The system according to claim 13, said full-view image being of insufficient quality to perform said recognizing patterns.

* * * * *